United States Patent
Asai

(10) Patent No.: US 9,542,072 B2
(45) Date of Patent: Jan. 10, 2017

(54) LIST DISPLAY APPARATUS, LIST DISPLAY METHOD AND GRAPHICAL USER INTERFACE

(75) Inventor: Atsushi Asai, Kanagawa (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 12/404,450

(22) Filed: Mar. 16, 2009

(65) Prior Publication Data

US 2009/0259975 A1    Oct. 15, 2009

(30) Foreign Application Priority Data

Apr. 10, 2008  (JP) .................................. 2008-102719

(51) Int. Cl.
G06F 3/0482 (2013.01)
G06F 3/0481 (2013.01)

(52) U.S. Cl.
CPC ......... G06F 3/0482 (2013.01); G06F 3/04815 (2013.01)

(58) Field of Classification Search
CPC  G06F 17/30994; G06F 3/0482; G06F 3/0483; H04N 5/44543; H04N 21/4821; H04N 21/4825
USPC .................................................. 715/850, 854
See application file for complete search history.

(56) References Cited

U.S. PATENT DOCUMENTS

| | | | |
|---|---|---|---|
| 6,252,597 B1* | 6/2001 | Lokuge | 715/841 |
| 6,924,822 B2* | 8/2005 | Card et al. | 345/660 |
| 7,000,126 B2* | 2/2006 | Stanley | 713/320 |
| 7,178,111 B2* | 2/2007 | Glein | G06F 3/0481 715/782 |
| 7,340,690 B2* | 3/2008 | Lau | 715/855 |
| 7,610,563 B2* | 10/2009 | Nelson et al. | 715/839 |
| 7,805,684 B2* | 9/2010 | Arvilommi | 715/829 |
| 8,065,603 B2* | 11/2011 | Gossweiler et al. | 715/227 |
| 8,181,119 B1* | 5/2012 | Ording | 715/810 |
| 2007/0168875 A1* | 7/2007 | Kowitz et al. | 715/764 |

FOREIGN PATENT DOCUMENTS

JP     61-18024 A     1/1986
JP     2000-47778     2/2000

(Continued)

OTHER PUBLICATIONS

Microsoft Windows Explorer for Windows XP Screenshots, Copyright 2007, 3 pages.*

(Continued)

*Primary Examiner* — Alvin Tan
(74) *Attorney, Agent, or Firm* — Oblon, McClelland, Maier & Neustadt, L.L.P.

(57) ABSTRACT

A list display apparatus includes: a picture generating unit for generating a three-dimensional list picture, the three-dimensional list picture having a plurality of lower item cards having a respective lower items in a hierarchical structure being unfolded and expanded in a bellows configuration when shifting from an upper level to a lower level of the hierarchical structure, or the plurality of lower item cards being folded and collapsed in a bellows configuration when shifting from the lower level to the upper level of the hierarchical structure; and a control unit for outputting the three-dimensional list picture to a predetermined display unit, thereby displaying the three-dimensional list picture.

19 Claims, 25 Drawing Sheets

(56) References Cited

FOREIGN PATENT DOCUMENTS

| | | |
|---|---|---|
| JP | 2001-175380 | 6/2001 |
| JP | 2003-345488 A | 12/2003 |
| JP | 2004-265244 A | 9/2004 |
| JP | 2006-139500 | 6/2006 |
| JP | 2006-338177 A | 12/2006 |

OTHER PUBLICATIONS

Japanese Office Action issued Jun. 26, 2012 in Patent Application No. 2008-102719.
Office Action issued Oct. 2, 2012, in Japanese Patent Application No. 2008-102719.
Combined Chinese Office Action and Search Report issued Jul. 30, 2014 in Patent Application No. 200910133524.7 (with English Translation).

\* cited by examiner

AL

| | |
|---|---|
| AN1 | Can't Buy Your Love |
| AN2 | Vocalism |
| AN3 | Kumo wa marude |
| AN4 | Beauty of the World |
| AN5 | Best_Of_Tiger_Ash:VOl.1 |
| AN6 | Best_Of_Tiger_Ash:VOl.2 |
| AN7 | Nami_no_uta_wo_kikasete |
| AN8 | Greatest Hits |
| AN9 | Ai no uta |
| AN10 | Destiny Border |
| AN11 | Hoshi no nai yozora |
| AN12 | Killer Chain |
| AN13 | Tako Best |
| AN14 | Single Collection |
| AN15 | Kiss |
| AN16 | FunFun |
| AN17 | Kospellers Works |
| AN18 | Spirits |
| AN19 | Speedy |
| AN20 | Onna uta |

| | |
|---|---|
| AN6 | Best_Of_Tiger_Ash:VOL.2 |
| AN7 | Nami no uta wo kikasete |
| AN8 | Greatest Hits |
| AN9 | Ai no uta |
| AN10 | Destiny Border |
| AN11 | Hoshi no nai yozora |
| AN12 | Killer Chain |
| AN13 | Tako Best |
| AN14 | Single Collection |
| AN15 | Kiss |

FIG. 10B

| | |
|---|---|
| AN7 | Nami no uta wo kikasete |
| AN8 | Greatest Hits |
| AN9 | Ai no uta |
| AN10 | Destiny Border |
| MN1 | POSSIBLE — ML1 / VL1 |
| MN2 | Everywhere Anywhere — ML2 |
| MN3 | Missing You |
| MN4 | Ai shiyou♪ — VL2 |
| | Seimeisen |
| | Would you be that one? |
| | Am I feeling for you? |
| | Heavyly |
| | Jikan |
| | Koi shiteru |
| | L·O·V·E M·E |
| MN14 | Over and Over — ML8 / VL7 |
| AN11 | Hoshi no nai yozora |

FIG. 10C

| | |
|---|---|
| AN8 | Greatest Hits |
| AN9 | Ai no uta |
| AN10 | Destiny Border |
| MN1 | POSSIBLE |
| MN2 | Everywhere Anywhere |
| MN3 | Missing You |
| MN4 | Ai shiyou♪ |
| | Seimeisen |
| | Would you be that one? |
| | Am I feeling for you? |
| | Heavyly |
| | Jikan |

FIG. 10D

| | |
|---|---|
| AN10 | Destiny Border |
| MN1 | POSSIBLE |
| MN2 | Everywhere Anywhere |
| MN3 | Missing You |
| MN4 | Ai shiyou♪ |
| | Seimeisen |
| | Would you be that one? |
| | Am I feeling for you? |
| | Heavyly |
| MN9 | Jikan |

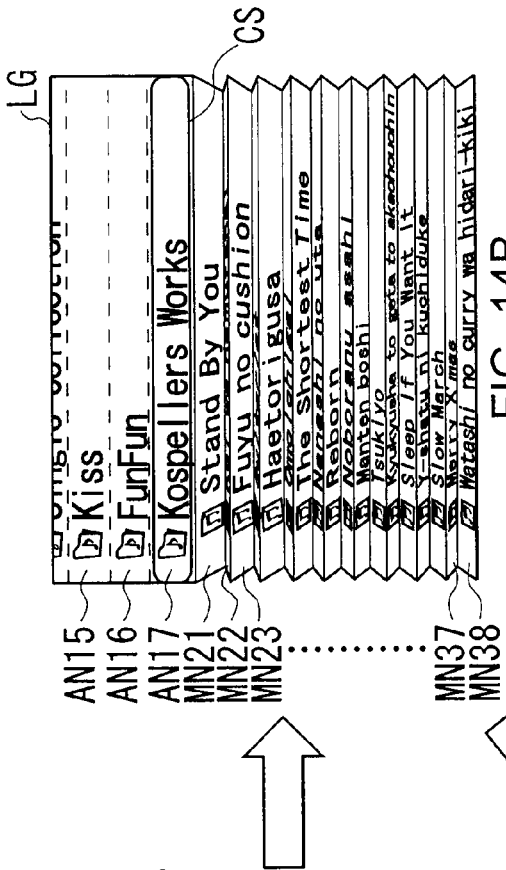
FIG. 14A
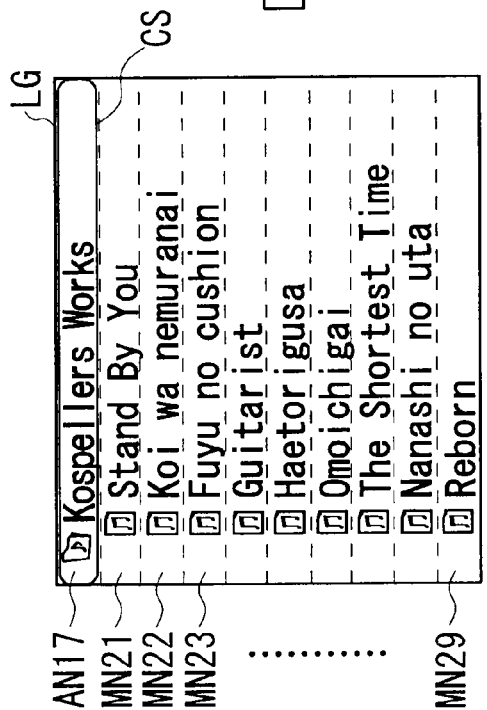
FIG. 14B
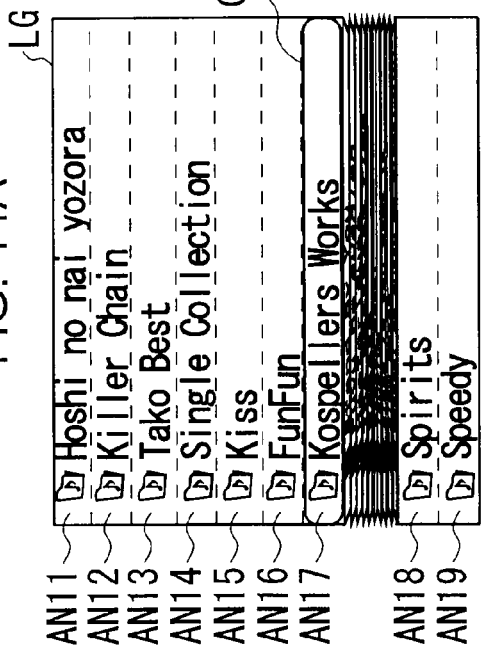
FIG. 14C
FIG. 14D

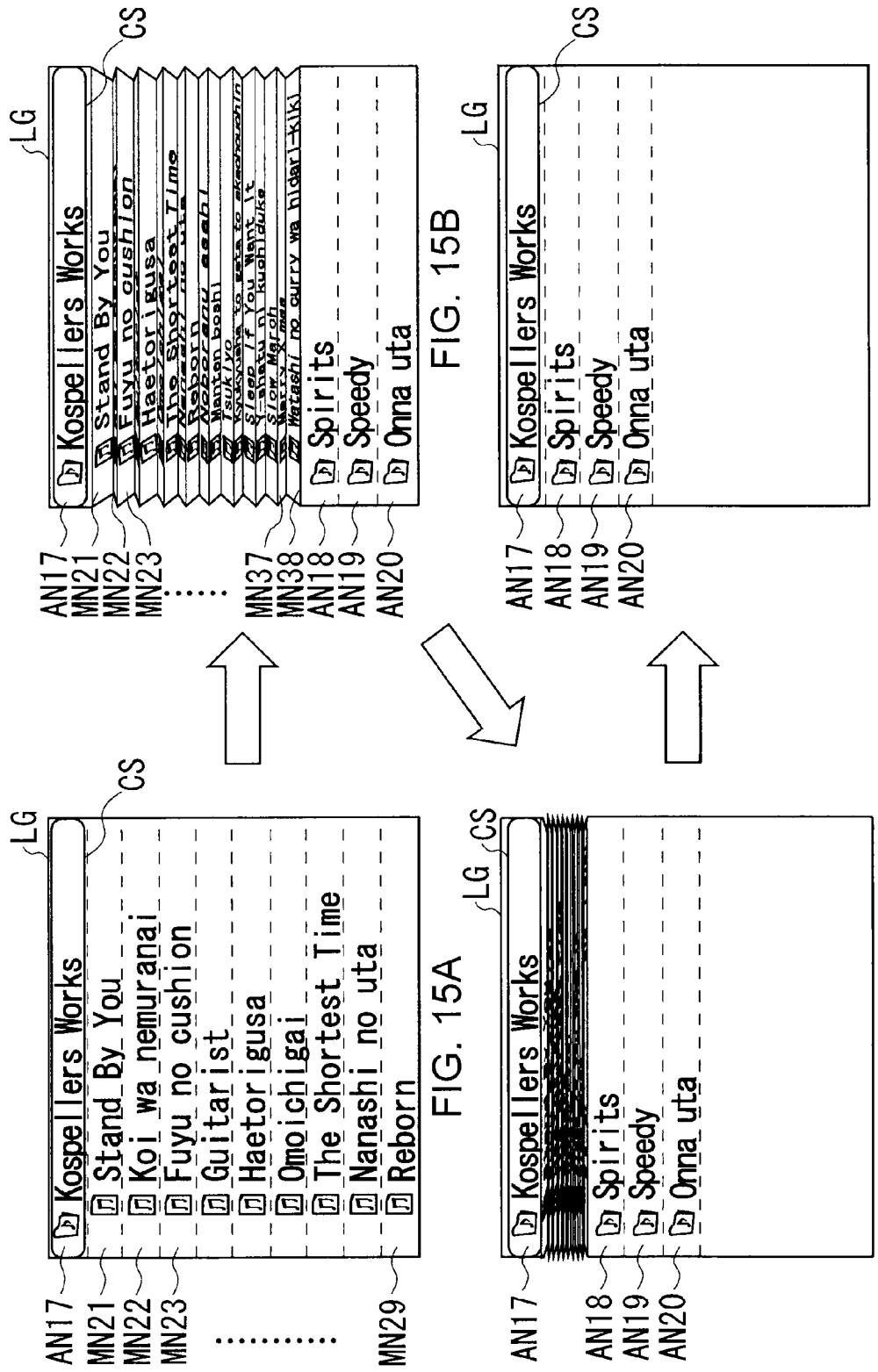

LIST DISPLAY APPARATUS, LIST DISPLAY METHOD AND GRAPHICAL USER INTERFACE

CROSS REFERENCE TO RELATED APPLICATIONS

The present invention contains subject matter related to Japanese Patent Application JP 2008-102719 filed in the Japanese Patent Office on Apr. 10, 2008, the entire contents of which being incorporated herein by reference.

BACKGROUND OF THE INVENTION

Field of the Invention

The present invention relates to a list display apparatus, a list display method, and a graphical user interface, and is suitably applicable to, for example, a portable music player which lists a plurality of album titles, song titles, etc.

Description of the Related Art

A portable audio player stores a large number of pieces of song data by saving the large number of pieces of song data into separate folders of hierarchical structure.

In so doing, the portable audio player stores, for example, a plurality of pieces of song data that are associated with an album title into an album folder that has the album title as its folder name in the form of respective song files.

When searching for a song file desired by a user, as shown in FIG. 1A, this portable audio player displays an album list screen ALG including a plurality of album titles on the monitor of the portable audio player.

As shown in FIG. 1B, if an album title, e.g., "Destiny Border" is selected from the album list screen ALG, the portable audio player then displays a song list screen MLG which includes a plurality of song files (song titles) stored in the album folder that has the folder name "Destiny Border".

In the meantime, there has been a means for displaying hierarchically structured data in a three-dimensional fashion, by which the pieces of data are distributed and arranged from upper levels to lower levels in order toward a cone bottom in a radial configuration, and are three-dimensionally displayed as a contents tree of cone shape (refer to, e.g., Jpn. Pat. Appln. Laid-Open Publication No. 2000-047778).

SUMMARY OF THE INVENTION

In the foregoing portable audio player, when an album title or an item of upper level is selected from the album list screen ALG, the album list screen ALG is instantaneously switched to display the song list screen MLG on which song titles or items of lower level are displayed.

Here, the portable audio player is not able to make the user visually observe the process of switching from the album list screen ALG to the song list screen MLG. There has thus been the problem that it is difficult to make the user intuitively recognize the hierarchical relationship and the like between the upper and lower levels.

The present invention has been achieved in view of the foregoing, and is thus intended to propose a list display apparatus, a list display method, and a graphical user interface which allow the user to intuitively recognize the hierarchical relationship between upper and lower levels in a list.

To solve the foregoing problem, a list display apparatus and a list display method according to an aspect of the present invention include: generating a three-dimensional list picture having a plurality of lower item cards having a respective lower items in a hierarchical structure being unfolded and expanded in a bellows configuration when shifting from an upper level to a lower level of the hierarchical structure, or the plurality of lower item cards being folded and collapsed in a bellows configuration when shifting from the lower level to the upper level of the hierarchical structure; and outputting the three-dimensional list picture to a predetermined display unit, thereby displaying the three-dimensional list picture.

As a result, a three-dimensional list picture can be presented such that a plurality of lower item cards are unfolded and expanded in a bellows configuration when shifting from an upper level to a lower level of the hierarchical structure, and the plurality of lower item cards are folded and collapsed in a bellows configuration when shifting from the lower level to the upper level of the hierarchical structure. This makes it possible for the user to visually observe the process of transition between the hierarchical levels.

A graphical user interface according to an aspect of the present invention includes: generating a three-dimensional list picture having a plurality of lower item cards having a respective lower items in a hierarchical structure being unfolded and expanded in a bellows configuration when shifting from an upper level to a lower level of the hierarchical structure, or the plurality of lower item cards being folded and collapsed in a bellows configuration when shifting from the lower level to the upper level of the hierarchical structure; and outputting the three-dimensional list picture to a predetermined display unit, thereby displaying the three-dimensional list picture.

As a result, a three-dimensional list picture can be presented such that a plurality of lower item cards are unfolded and expanded in a bellows configuration when shifting from an upper level to a lower level of the hierarchical structure, and the plurality of lower item cards are folded and collapsed in a bellows configuration when shifting from the lower level to the upper level of the hierarchical structure. This makes it possible for the user to visually observe the process of transition between the hierarchical levels.

According to the present invention, a three-dimensional list picture can be presented such that a plurality of lower item cards are unfolded and expanded in a bellows configuration when shifting from an upper level to a lower level of the hierarchical structure, and the plurality of lower item cards are folded and collapsed in a bellows configuration when shifting from the lower level to the upper level of the hierarchical structure. This makes it possible for the user to visually observe the process of transition between the hierarchical levels. Consequently, it is possible to provide a list display apparatus, a list display method, and a graphical user interface which allow the user to intuitively recognize the hierarchical relationship between upper and lower levels in a list.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a schematic diagram showing an album list;

FIG. 6 is a schematic diagram showing what the display area of album item cards and song item cards is like;

FIGS. 10A to 10D are schematic diagrams showing how song item cards are expanded when the album item card is moved for display;

FIGS. 14A to 14D are schematic diagrams showing the state (1) how song item cards are collapsed when the album item card is moved for display;

FIGS. 15A to 15D are schematic diagrams showing the state (2) how song item cards are collapsed when the album item card is moved for display;

DETAILED DESCRIPTION OF THE PREFERRED EMBODIMENTS

Hereinafter, an embodiment of the present invention will be described in detail with reference to the drawings.

(1) Configuration of Portable Audio Player

(1-1) External Configuration of Portable Audio Player

Figures 1A, 1B:
FIGS. 1A and 1B are schematic diagrams showing the display screens of a conventional two-dimensional album list and song list.
Figure 2:
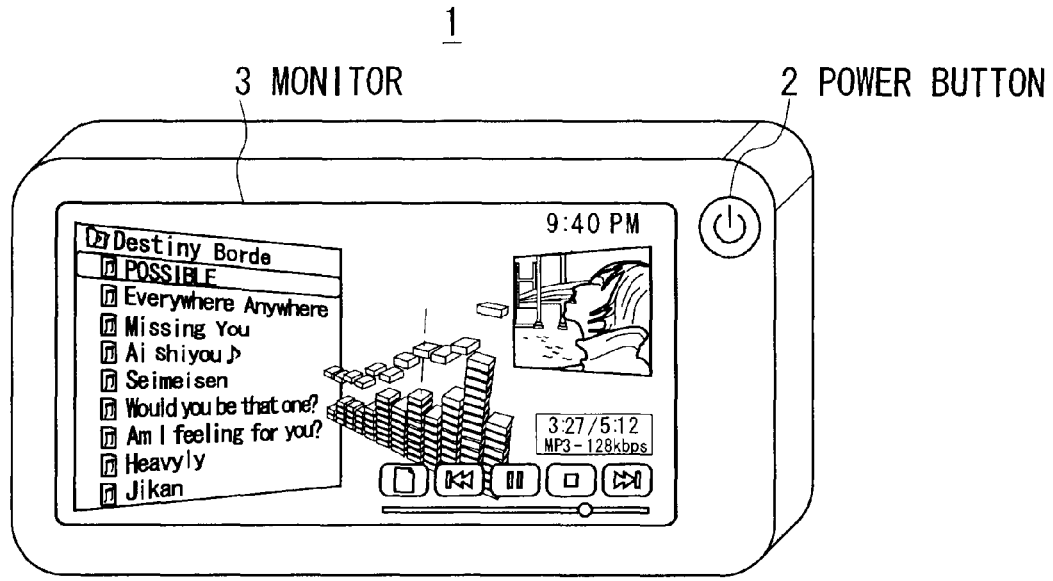
FIG. 2 is a schematic diagram showing the external configuration of a portable audio player.

FIG. 2 shows a portable audio player 1 according to an aspect of the present invention. The portable audio player 1 runs on power supply from a not-shown battery in response to a depressing operation on a power button 2.

This portable audio player 1 has a monitor 3 on the front side, and can display a song select screen, song play screen, and the like to be described later on this monitor 3.

(1-2) Circuit Configuration of Portable Audio Player

Figure 3:
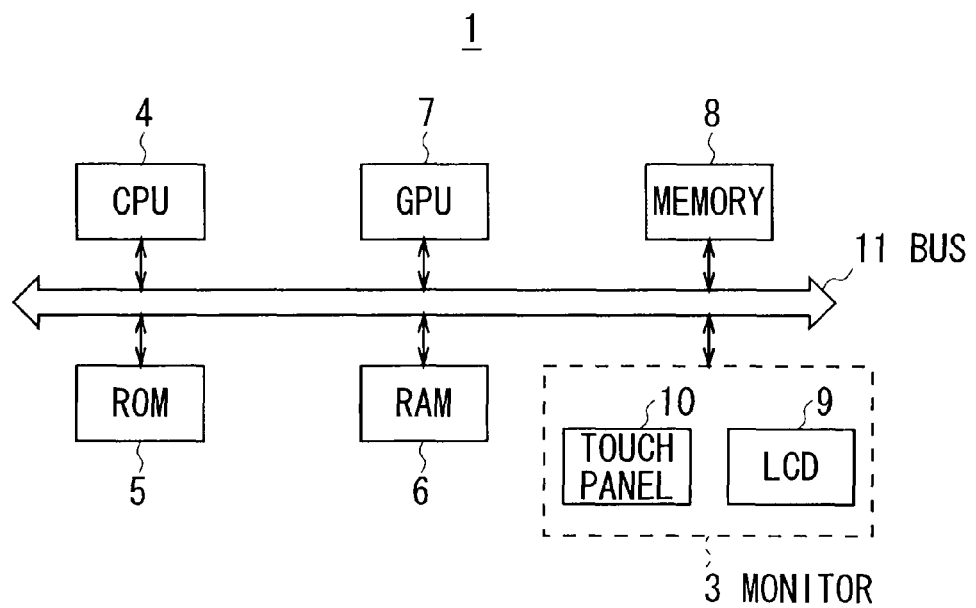
FIG. 3 is a schematic diagram showing the circuit configuration of the portable audio player.

As shown in FIG. 3, the portable audio player 1 exercises centralized control on the entire apparatus through a bus 11 according to a basic program that is read from a read only memory (ROM) 5 and run on a random access memory (RAM) 6 by a central proceeding unit (CPU) 4.

The portable audio player 1 can provide various functions according to various types of application programs that are read from the ROM 5 and run on the RAM 6 by the CPU 4.

This portable audio player 1 can store a large number of pieces of song data in a memory 8 which is composed of a hard disk drive, a nonvolatile memory, or the like. As with typical storage media of a personal computer, the memory 8 contains the song data in units of files which are allocated among a plurality of folders constructed hierarchically.

For example, in the memory 8, a plurality of pieces of song data that are associated with an album title are stored into an album folder that has the album title as its folder name, in the form of respective song files. When these song files are stored in the album folder, song titles are simply used as their respective song file names.

The CPU 4 of the portable audio player 1 is activated by the power supply from the battery (not shown), for example, in response to a depressing operation on the power button 2. The CPU 4 then performs a mode for selecting a user-desired song file (hereinafter, this mode will be referred to as song select mode) and makes a preparation to generate a song select screen (to be described later) for displaying album titles and song titles.

A touch panel 10 is arranged on the surface of a liquid crystal display (LCD) 9 of the monitor 3. When a user-desired song title is selected according to user's touch operations on the touch panel 10, the CPU 4 of the portable audio player 1 performs a mode for playing the song file that corresponds to the song title (hereinafter, this mode will be referred to as song play mode). Here, the CPU 4 makes a preparation to generate a song play screen (to be described later) which is to be displayed on the LCD 9 of the monitor 3 when the song file is being played.

A GPU 7 of the portable audio player 1 draws a song select screen and a song play screen based on the result of various preparations made by the CPU 4, and displays the song select screen and the song play screen on the LCD 9 of the monitor 3.

(2) Song Select Mode

(2-1) General Configuration of Song Select Screen

Next, description will be given of the song select mode in which a song file name corresponding to a user-desired song file is selected on the portable audio player 1.

When the portable audio player 1 is activated, for example, in response to a depressing operation on the power button 2, the CPU 4 of the portable audio player 1 initiates the song select mode according to a song select application which is read from the ROM 5 and run on the RAM 6.

Figure 4:
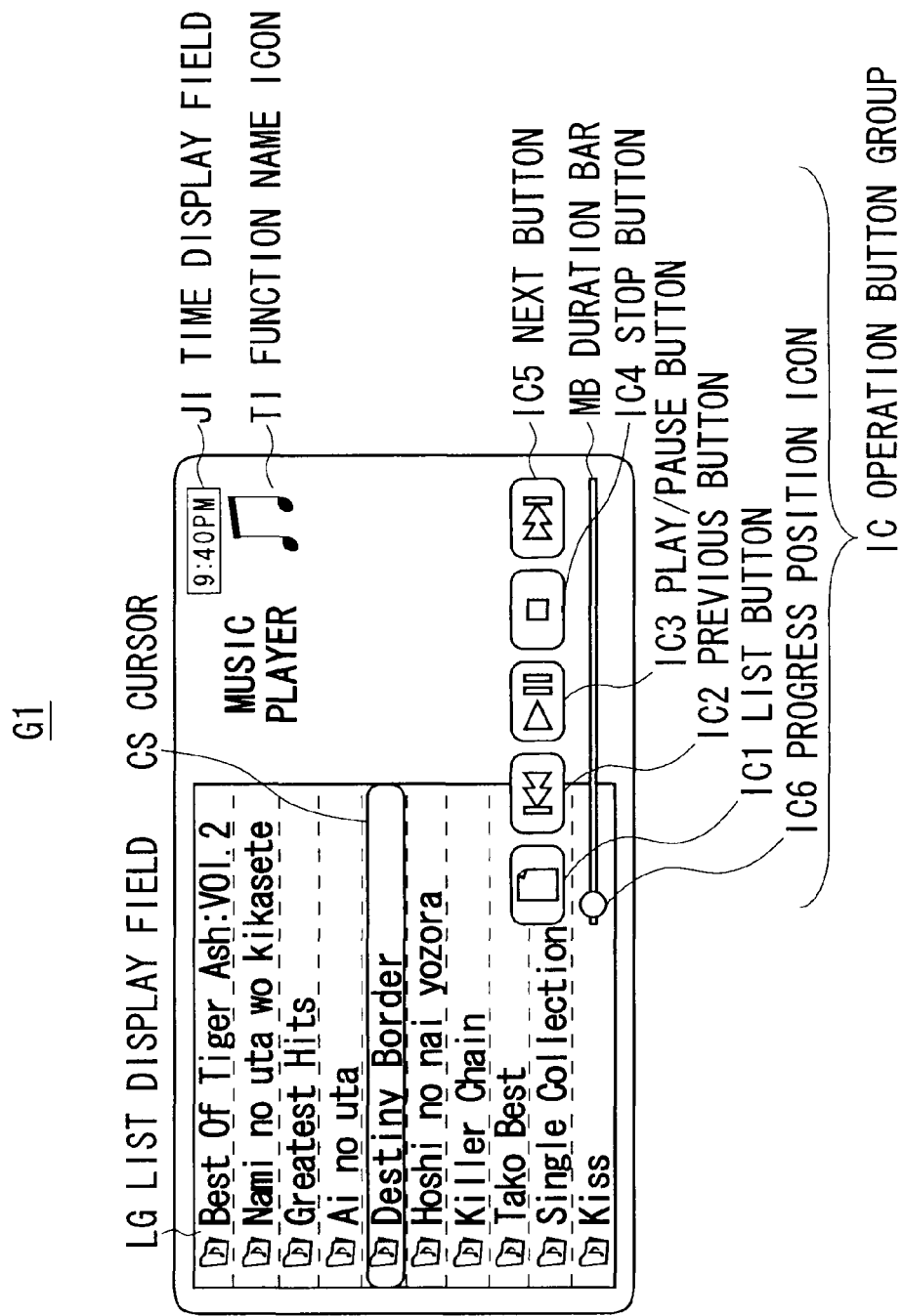
FIG. 4 is a schematic diagram showing the configuration (1) of a song select screen.

Entering the song select mode, the CPU 4 of the portable audio player 1 makes the GPU 7 draw a song select screen G1 and displays the song select screen G1 on the LCD 9 of the monitor 3 as shown in FIG. 4.

This song select screen G1 includes a list display field LG, a time display field JI for displaying the current time, a function name icon TI, and a operation button group IC for accepting user's touch operations.

The list display field LG displays a plurality of album titles so that the user can visually observe the album titles displayed in this list display field LG.

The operation button group IC includes a list button IC1, a previous button IC2, a play/pause button IC3, a stop button IC4, a next button IC5, and a progress position icon IC6 which moves over a duration bar MB. The operation button group IC functions as a user interface for accepting user's touch operations.

A cursor CS is displayed in the list display field LG of the song select screen G1. The cursor CS is intended to select a user-desired album title from among the album titles displayed in this list display field LG.

The list display field LG can only display a total of, e.g., 10 album titles because of the screen size. If the number of album titles to be displayed exceeds 10, the CPU 4 of the portable audio player 1 can scroll the album titles to be displayed in the list display field LG up/down according to touch operations on the touch panel 10 of the monitor 3.

Specifically, the CPU 4 of the portable audio player 1 reads all the folder names (album titles) of the album folders stored in the memory 8. As shown in FIG. 5, the CPU 4 of the portable audio player 1 then generates an album list AL on which album item cards AN (AN1 to AN20) corresponding to the respective folder names are listed in order.

Here, the album item card AN1 has an album title "Can't Buy Your Love," the album item card AN2 an album title "Vocalism," and the album item card AN3 an album title "Kumo wa marude." The subsequent album item cards AN4 to AN20 are likewise given respective album titles.

The CPU 4 of the portable audio player 1 then displays 10 album item cards AN in the list display field LG flatly, out of all the album item cards AN1 to AN20 on the album list AL.

Figure 6:
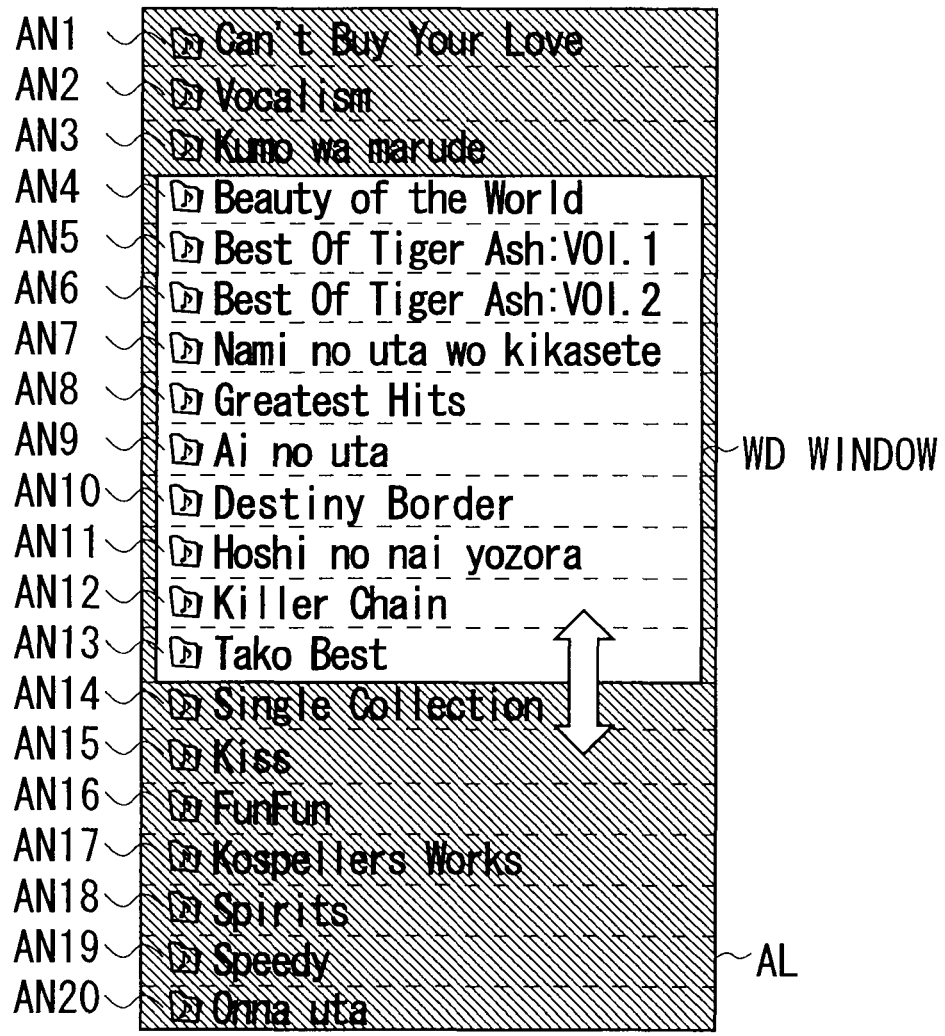

For example, as shown in FIG. 6, the CPU 4 of the portable audio player 1 displays in the list display field LG (FIG. 4) the 10 album item cards AN that are covered with a window WD (in this case, the album item cards AN4 to AN13) on the album list AL.

The CPU 4 of the portable audio player 1 moves the window WD on the album list AL downward, for example, when the user touches a predetermined area of the song select screen G1 displayed on the monitor 3 as if sweeping from top to bottom.

Here, the CPU 4 of the portable audio player 1 covers, for example, the album item card AN5 to the album item card AN14 of the album list AL with the window WD, and displays the album item cards AN5 to AN14 covered with the window WD in the list display field LG (FIG. 4). The CPU 4 of the portable audio player 1 moves the window WD of the album list AL (FIG. 6) upward, for example, when the user touches a predetermined area of the song select screen G1 displayed on the monitor 3 as if sweeping from bottom to top.

Here, the CPU 4 of the portable audio player 1 covers, for example, the album item card AN3 to the album item card AN12 of the album list AL with the window WD, and displays the album item cards AN3 to AN12 covered with the window WD in the list display field LG.

The CPU 4 of the portable audio player 1 can thus scroll the window WD up/down with respect to the album list AL according to the user's upward/downward touch operations on the predetermined area of the monitor 3, thereby shifting the 10 album item cards over the album item cards AN1 to AN20 of the album list AL.

Figure 7A:
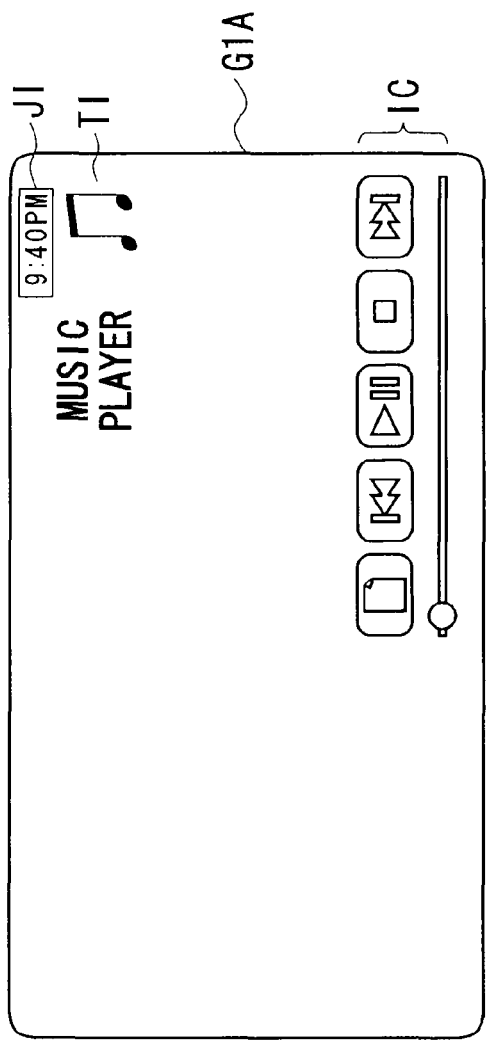
FIGS. 7A and 7B are schematic diagrams showing plane pictures of the song select screen.
Figure 7B:
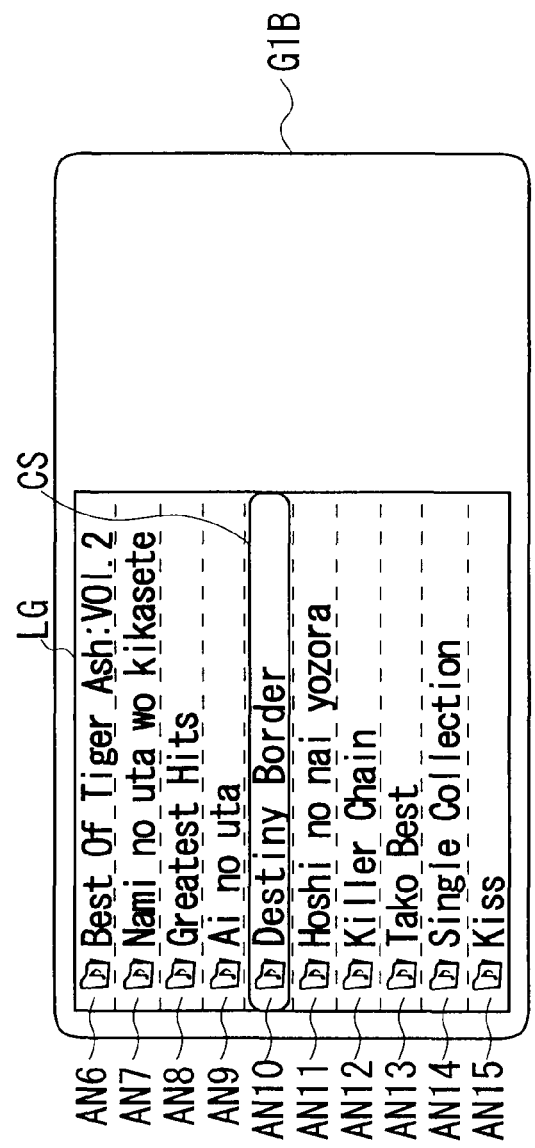
Figure 8:
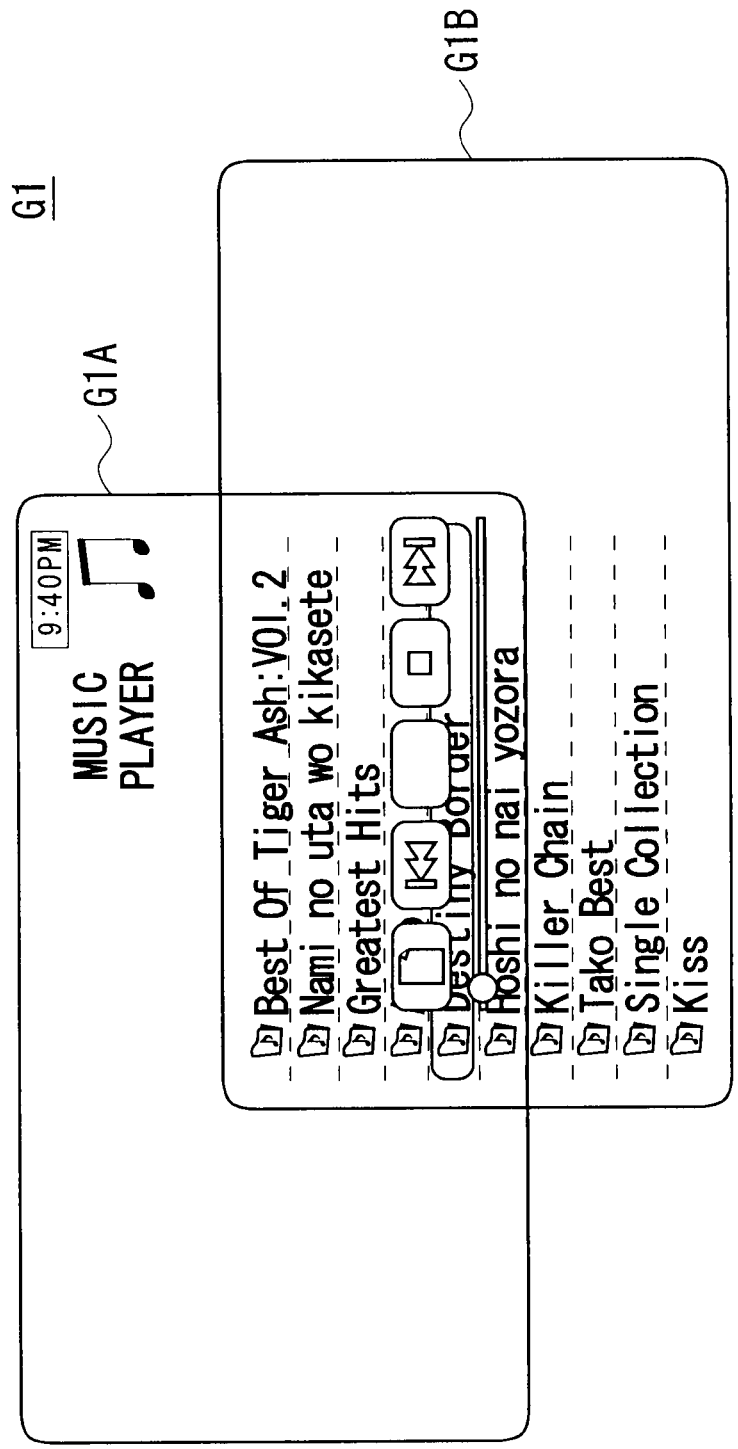
FIG. 8 is a schematic diagram showing the song select screen of two-layer structure.

As shown in FIG. 8, the song select screen G1 (FIG. 4) is formed by superimposing a button display picture G1A and a list display picture G1B in top and bottom two layers. The button display picture G1A includes the operation button group IC, the time display field JI, and the function name icon TI as shown in FIG. 7A. The list display picture G1B includes the list display field LG alone as shown in FIG. 7B.

Consequently, when the predetermined area of the monitor 3 is operated by touch upward or downward, the portable audio player 1 can present the song selection screen G1 by shifting and displaying only the album item cards AN to be displayed in the list view field LG of the list display picture G1B, with the button display picture G1A unchanged.

(2-2) Song Item Card Expansion Processing

Figures 9A, 9B:
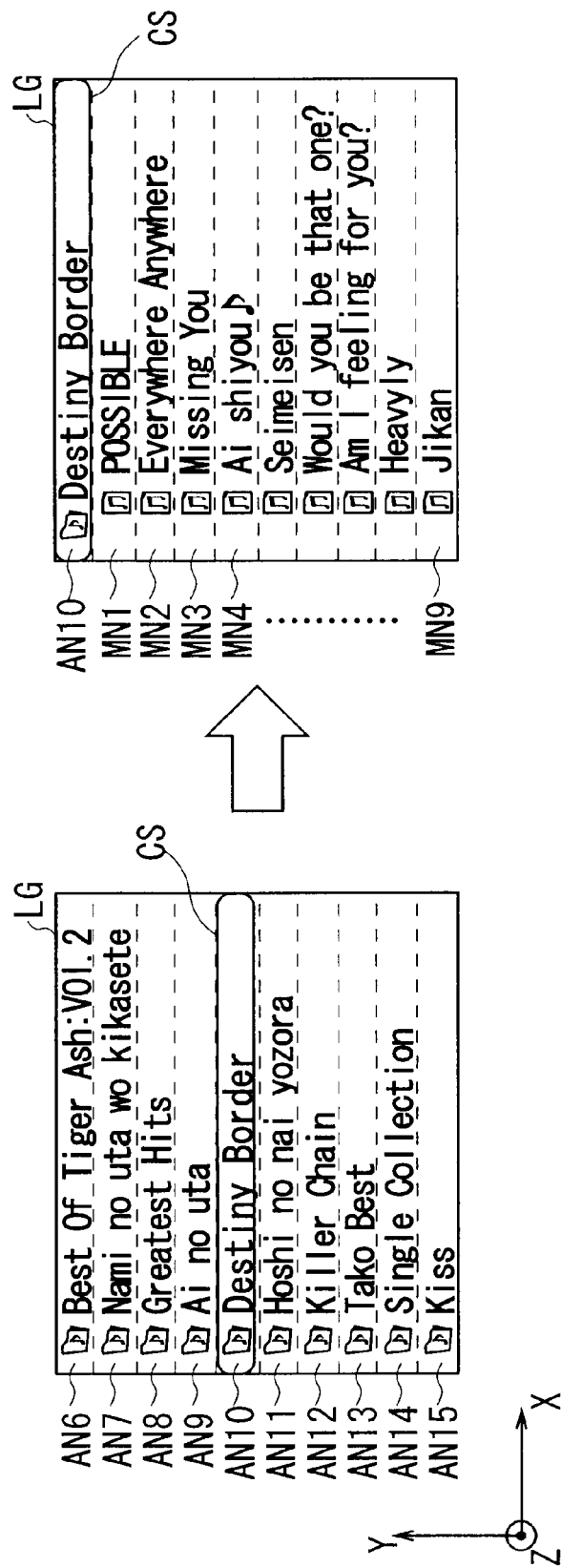
FIGS. 9A and 9B are schematic diagrams showing how song item cards are expanded.

As shown in FIG. 9A, when the album item card AN10 is selected with the cursor CS from among the album item cards AN6 to AN15 in the list display field LG and the list button IC1 is operated by touch, the CPU 4 of the portable audio player 1 proceeds to the following processing.

Then, as shown in FIG. 9B, the CPU 4 of the portable audio player 1 can display song item cards MN1 to MN9 that are associated with the album item card AN10.

The song item cards MN1 to MN9 are given the song titles of a plurality of song files stored in the album folder corresponding to the album item card AN10.

Note that when the album item card AN10 is selected, the CPU 4 of the portable audio player 1 will not display the song item cards MN1 to MN9 associated with the album item card AN10 instantaneously, but can provide a predetermined animated display (to be described later) until the song item cards MN1 to MN9 are eventually presented.

In the list display field LG, the horizontal direction in which album titles and song titles are written from left to right shall be X-axis. The vertical direction in which a plurality of album item cards AN and song item cards MN are vertically arranged shall be Y-axis. The direction perpendicular to a plane formed by the X-axis and Y-axis shall be Z-axis.

(2-2-1) Song Item Card Expansion Processing When Album Item Card is Moved for Display In fact, suppose that album item cards, e.g., AN6 to AN15 are displayed flatly in the list display field LG as shown in FIG. 10A. When the album item card AN10 is selected with the cursor CS and the list button IC1 is operated by touch, the CPU 4 of the portable audio player 1 proceeds to the following processing.

As shown in FIG. 10B, the CPU 4 of the portable audio player 1 expands all the song item cards MN1 to MN14 that are associated with the selected album item card AN10, in a bellows configuration between the album item card AN10 and the next album item card AN11.

Specifically, when the CPU 4 of the portable audio player 1 recognizes the touch operation on the list button IC1 (FIG. 4), it reads all the song item cards MN1 to MN14 that are associated with the album item card AN10.

Here, the CPU 4 of the portable audio player 1 makes the GPU 7 draw a valley side borderline VL1 between the song item card MN1 and the song item card MN2 as valley-folded, and a mountain side borderline ML2 between the song item card MN2 and the song item card MN3 as mountain-folded. The rest in the same way from valley side borderline VL2, and the CPU 4 of the portable audio player 1 finally makes the GPU 7 draw a valley side borderline VL7 between the song item card MN13 and the song item card MN14 as valley-folded.

Note that the CPU 4 of the portable audio player 1 makes the GPU 7 draw a mountain side borderline ML1 between the album item card AN10 and the song item card MN1 as mountain-folded, and a mountain side borderline ML8 between the song item card MN14 and the album item card AN11 as mountain-folded.

As shown in FIG. 10C, the CPU 4 of the portable audio player 1 then unfolds and expands the song item cards MN1 to MN14 gradually with a lapse of time, while moving up the album item card AN10 for display.

While expanding the song item cards MN1 to MN14, the CPU 4 of the portable audio player 1 pushes down on the album item card AN11 with the song item card MN14 until the album item card AN11 disappears from the list display field LG. The reason is that a higher priority is given to displaying the song item cards MN1 to MN14 associated with the album item card AN10 in the list display field LG.

As shown in FIG. 10D, the CPU 4 of the portable audio player 1 finally expands all the song item cards MN1 to MN14 flatly and displays them as arranged in order, with the album item card AN10 at the top of the list display field LG.

When all the song item cards MN1 to MN14 are expanded flatly, the list display field LG is not able to display all the song item cards MN1 to MN14 as in FIG. 10B, but only displays 10 items including the album item card AN10 and the song item cards MN1 to MN9.

Incidentally, the song item card MN1 has a song title "POSSIBLE", the song item card MN2 a song title "Everywhere Anywhere", and the song item card MN3 a song title "Missing you". The subsequent song item cards MN4 to MN14 are likewise given respective song titles.

As described above, the album item cards AN6 to AN15 are first displayed flatly (FIG. 10A) in the list display field LG. The song item cards MN1 to MN14 associated with the album item card AN10 are then displayed in a bellows configuration temporarily (FIG. 10B) so that a greater amount of information can be displayed on a single screen.

Here, as shown in FIG. 10B, the album item cards AN7 to AN10 are displayed in the list display field LG while the song item cards MN1 to MN14 are displayed in a bellows configuration. This makes it possible for the user to visually observe both the album item cards AN7 to AN10 and the song item cards MN1 to MN14.

The list display field LG (FIG. 10B) can thus make the user intuitively recognize the hierarchical relationship between the album item card AN10 and the song item cards MN1 to MN14 which are associated with this album item card AN10.

Finally, the CPU 4 of the portable audio player 1 displays the album item card AN10 at the top of the list display field LG (FIG. 10D) and displays the song item cards MN1 to MN9 below as expanded flatly, whereby the song item cards MN1 to MN9 can be presented to the user with high visibility.

Consequently, the list display field LG can facilitate the user recognizing the process of transition from the state where the album item cards AN6 to AN15 are displayed to the state where the song item cards MN1 to MN9 are displayed.

(2-2-2) Song Item Card Expansion Processing When Album Item Card is not Moved for Display As shown in FIGS. 11A to 11D, the CPU 4 of the portable audio player 1 may display the list display field LG in which the song item cards MN1 to MN14 associated with the user-selected album item card AN10 are expanded without moving the album item card AN10 to the top of the list display field LG.

Figure 11A:
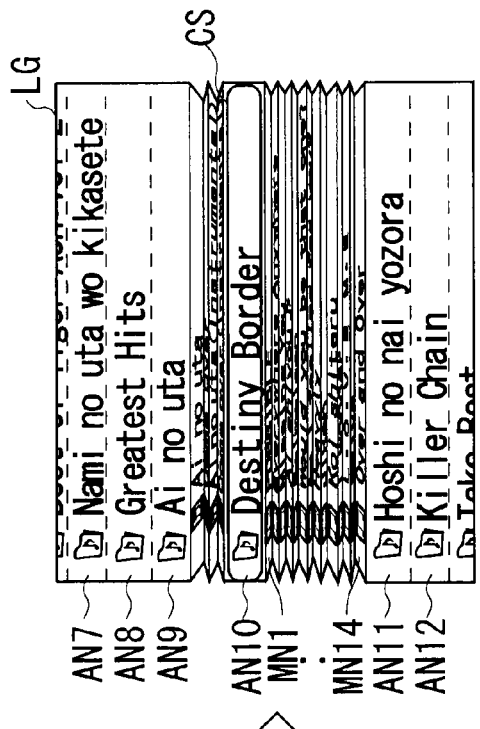
FIGS. 11A to 11D are schematic diagrams showing how song item cards are expanded when the album item card is not moved for display.
Figure 11B:
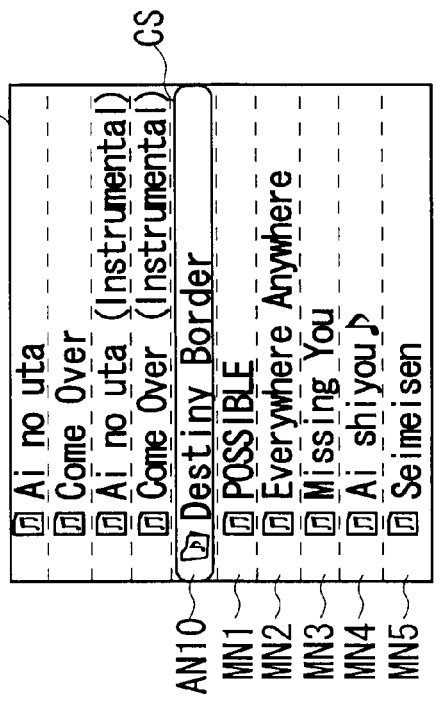
Figure 11C:
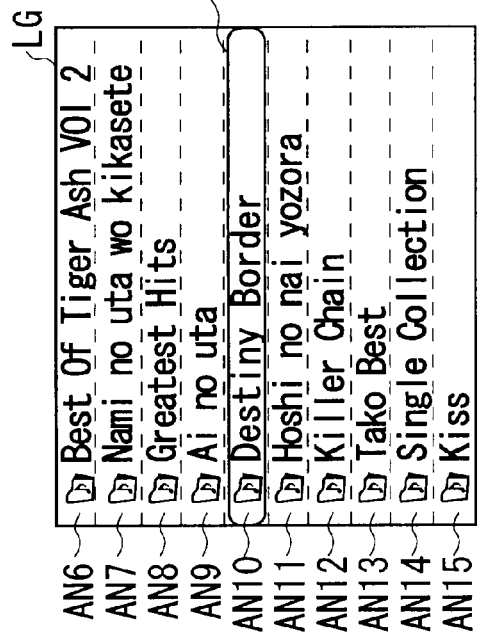
Figure 11D:
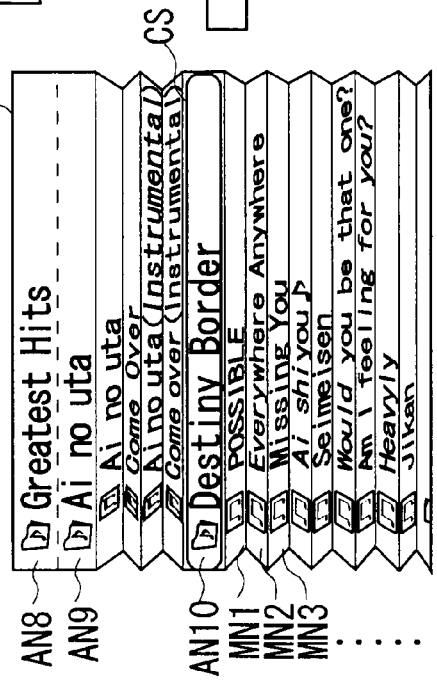

In fact, when the album item card AN10 is selected in the list display field LG (FIG. 11A), the CPU 4 of the portable audio player 1 unfolds and expands the song item cards MN1 to MN14 associated with this album item card AN10 in a bellows configuration as shown in FIGS. 11B and 11C. Here, the CPU 4 of the portable audio player 1 will not simply move the album item card AN10 for display.

In this case, the list display field LG (FIG. 11D) displays only five song item cards MN1 to MN5 under the user-selected album item card AN10 since the album item card AN10 is not moved and displayed to the top.

Consequently, when the album item card AN10 is not moved for display (FIG. 11D), the number of song item cards MN in the list display field LG is smaller than when the album item card AN10 is moved and displayed to the top (FIG. 10D).

(2-3) Song Item Card Collapsing Processing

Figures 12A, 12B:
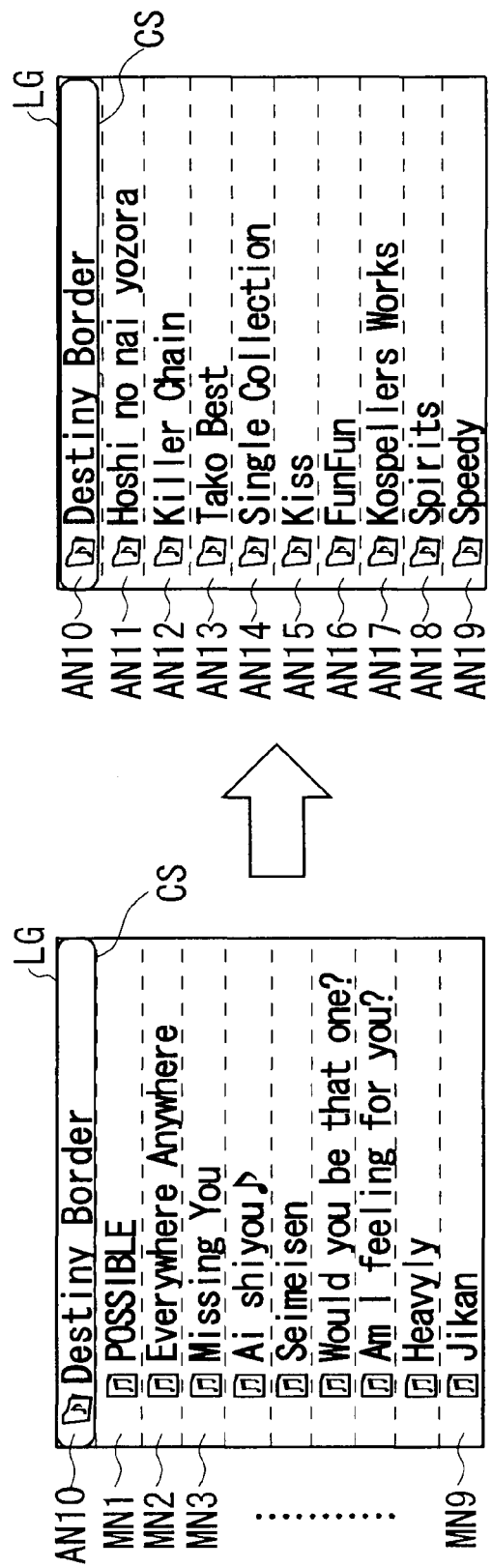
FIGS. 12A and 12B are schematic diagrams showing how song item cards are collapsed.

Now, when the album item card AN10 and the song item cards MN1 to MN9 are displayed in the list display field LG as shown in FIG. 12A and the list button IC1 is operated by touch, the CPU 4 of the portable audio player 1 proceeds to the following processing.

As shown in FIG. 12B, the CPU 4 of the portable audio player 1 can collapse all the song item cards MN1 to MN9 to display the album item cards AN10 to AN19.

Note that when the album item card AN10 is selected, the CPU 4 of the portable audio player 1 will not display the album item cards AN10 to AN19 instantaneously, but can provide a predetermined animated display (to be described later) until the album item cards AN10 to AN19 are eventually presented.

Figure 13A:
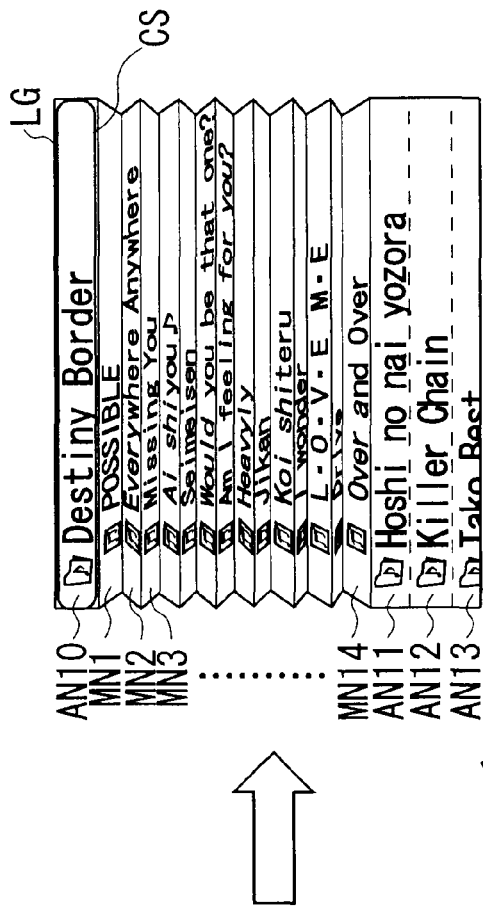
FIGS. 13A to 13D are schematic diagrams showing how song item cards are collapsed when the album item card is not moved for display.

(2-3-1) Song Item Card Collapsing Processing When Album Item Card is not Moved for Display In fact, suppose, for example, that the album item card AN10 and the song item cards MN1 to MN9 are displayed flatly in the list display field LG as shown in FIG. 13A. When the album item card AN10 is selected with the cursor CS and the list button IC1 is operated by touch, the CPU 4 of the portable audio player 1 proceeds to the following processing.

Figure 13B:
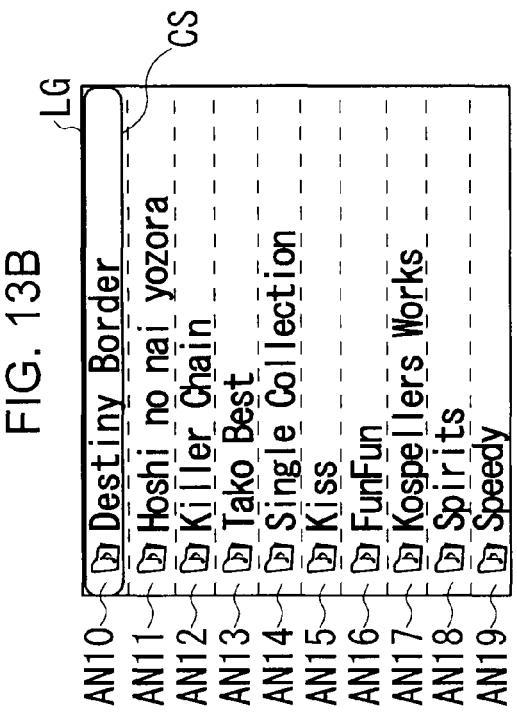

As shown in FIG. 13B, the CPU 4 of the portable audio player 1 folds all the song item cards MN1 to MN14 that are associated with the selected album item card AN10, into a bellows configuration between the album item card AN10 and the next album item card AN11.

Figure 13C:
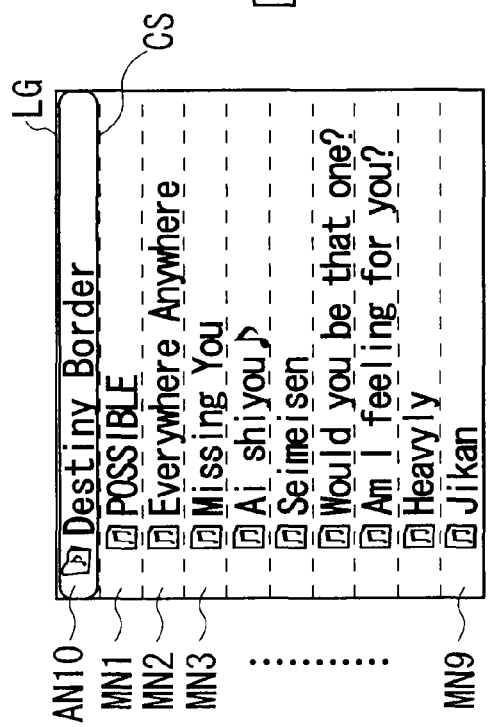

As shown in FIG. 13C, the CPU 4 of the portable audio player 1 gradually folds the song item cards MN1 to MN14 with a lapse of time until all are stacked and collapsed.

Figure 13D:
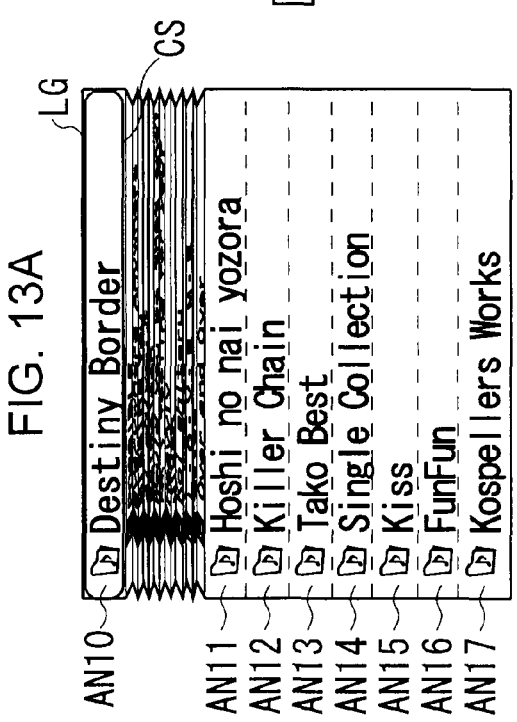

As shown in FIG. 13D, the CPU 4 of the portable audio player 1 finally displays the album item cards AN10 to AN19 flatly, with the song item cards MN1 to MN14 having disappeared under the album item card AN10.

As described above, in the list display field LG, all the song item cards MN1 to MN14 associated with the user-selected album item card AN10 are folded and collapsed in a bellows configuration so that the user can visually observe how the song item cards MN1 to MN14 are being collapsed.

The list display field LG can thus facilitate the user recognizing the process of transition from the state where the song item cards MN1 to MN9 are displayed to the state where the album item cards AN10 to AN19 are displayed.

(2-3-2) Song Item Card Collapsing Processing When Album Item Card is Moved for Display Now, as shown in FIG. 14A, suppose that the album item card AN17 and song item cards MN21 to MN29 associated with this album item card AN17 are displayed flatly in the list display field LG. When the album item card AN17 is selected with the cursor CS and the list button IC1 is operated by touch, the CPU 4 of the portable audio player 1 proceeds to the following processing.

As shown in FIG. 14B, the CPU 4 of the portable audio player 1 folds all song item cards MN21 to MN38 that are associated with the selected album item card AN17, into a bellows configuration under the album item card AN17.

As shown in FIG. 14C, the CPU 4 of the portable audio player 1 folds the song item cards MN21 to MN38 gradually with a lapse of time, while moving down the album item card AN17 for display.

As shown in FIG. 14D, the CPU 4 of the portable audio player 1 finally displays the album item card AN20 at the bottom of the list display field LG, with the song item cards MN21 to MN38 having disappeared under the album item card AN17.

That is, when the song item cards MN21 to MN38 are folded in a bellows configuration in the list display field LG, the album item card AN20 at the bottom of the album list AL (FIG. 5) is displayed at the bottom of the list display field LG.

By moving down the album item card AN17 for display, the CPU 4 of the portable audio player 1 can thus display the album item cards AN11 to AN20 without producing a blank area in the list display field LG.

Note that if the CPU 4 of the portable audio player 1 displays the album item card AN17 selected with the cursor CS without movement, a blank area occurs in the bottom of the list display field LG as shown in FIGS. 15A to 15D.

Incidentally, the song item card MN21 has a song title "Stand By You," the song item card MN22 a song title "Koi Wa Nemuranai," and the song item card MN23 a song title "Fuyu No Cushion." The subsequent song item cards MN24 to MN38 are likewise given respective song titles.

(2-4) State Transition Between Expansion and Collapsing of Song Item Cards

Figure 16:
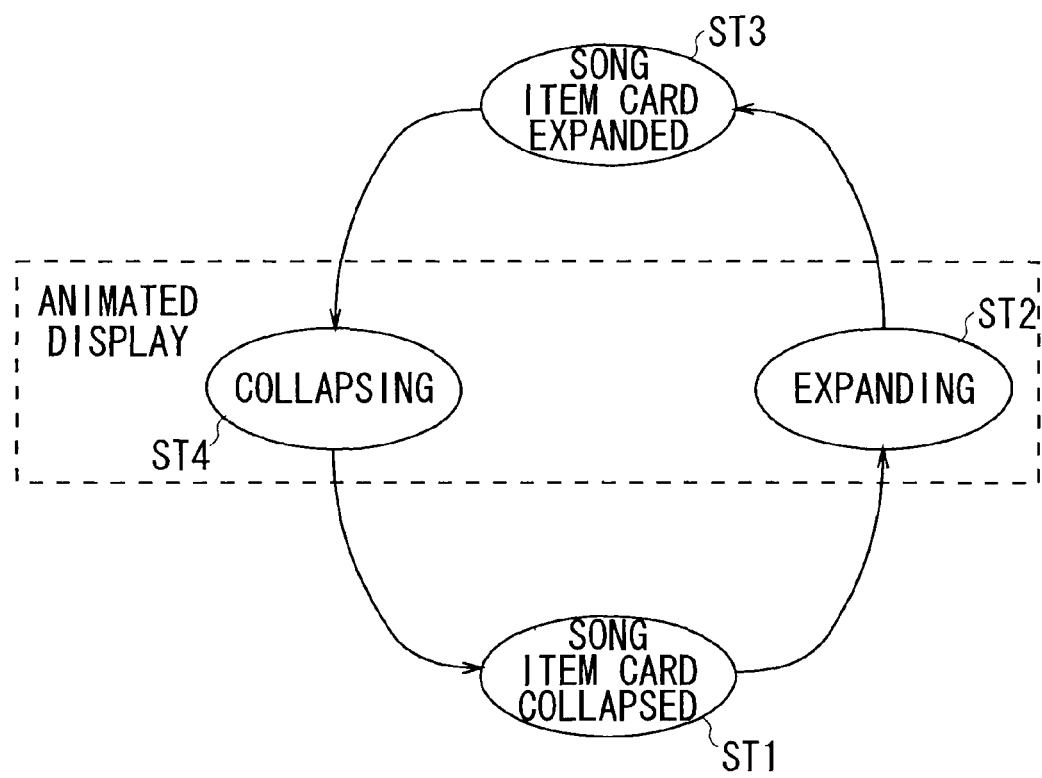
FIG. 16 is a schematic diagram showing a state transition diagram between expansion and collapsing of song item cards.

Suppose that the CPU 4 of the portable audio player 1 is in a song item card collapsed state ST1 (FIG. 10A) as shown in FIG. 16, for example, where the album item cards AN6 to AN15 are displayed in the list display field LG. When the cursor CS is focused on the album item card AN10 and the list button IC1 is then operated by touch, the CPU 4 of the portable audio player 1 scrolls and displays the album item card AN10 to the top of the list display field LG.

At the same time, the CPU 4 of the portable audio player 1 enters an expanding state ST2 (FIGS. 10B and 10C) where an animated display is provided such that all the song item cards MN1 to MN14 corresponding to the album item card AN10 are unfolded and expanded in a stereoscopic bellows configuration.

Through the intermediary of the expanding state ST2 from the song item card collapsed state ST1, the CPU 4 of the portable audio player 1 changes to a song item card expanded state ST3 (FIGS. 10C and 13A) where all the song item cards MN1 to MN14 associated with the user-selected album item card AN10 are expanded completely.

Next, when the list button IC1 is operated by touch in the song item card expanded state ST3 (FIG. 13A), the CPU 4 of the portable audio player 1 scrolls and displays the list display field LG so as not to produce a blank area.

At the same time, the CPU 4 of the portable audio player 1 enters a collapsing state ST4 (FIGS. 13B and 13C) where an animated display is provided such that the song item cards MN1 to MN14 are folded and collapsed in a bellows configuration.

Through the intermediary of the collapsing state ST4 from the song item card expanded state ST3, the CPU 4 of the portable audio player 1 returns to the song item card collapsed state ST1 (FIG. 13D) where the album item cards AN10 to AN19 are displayed.

(3) Song Play Mode

Figure 17:
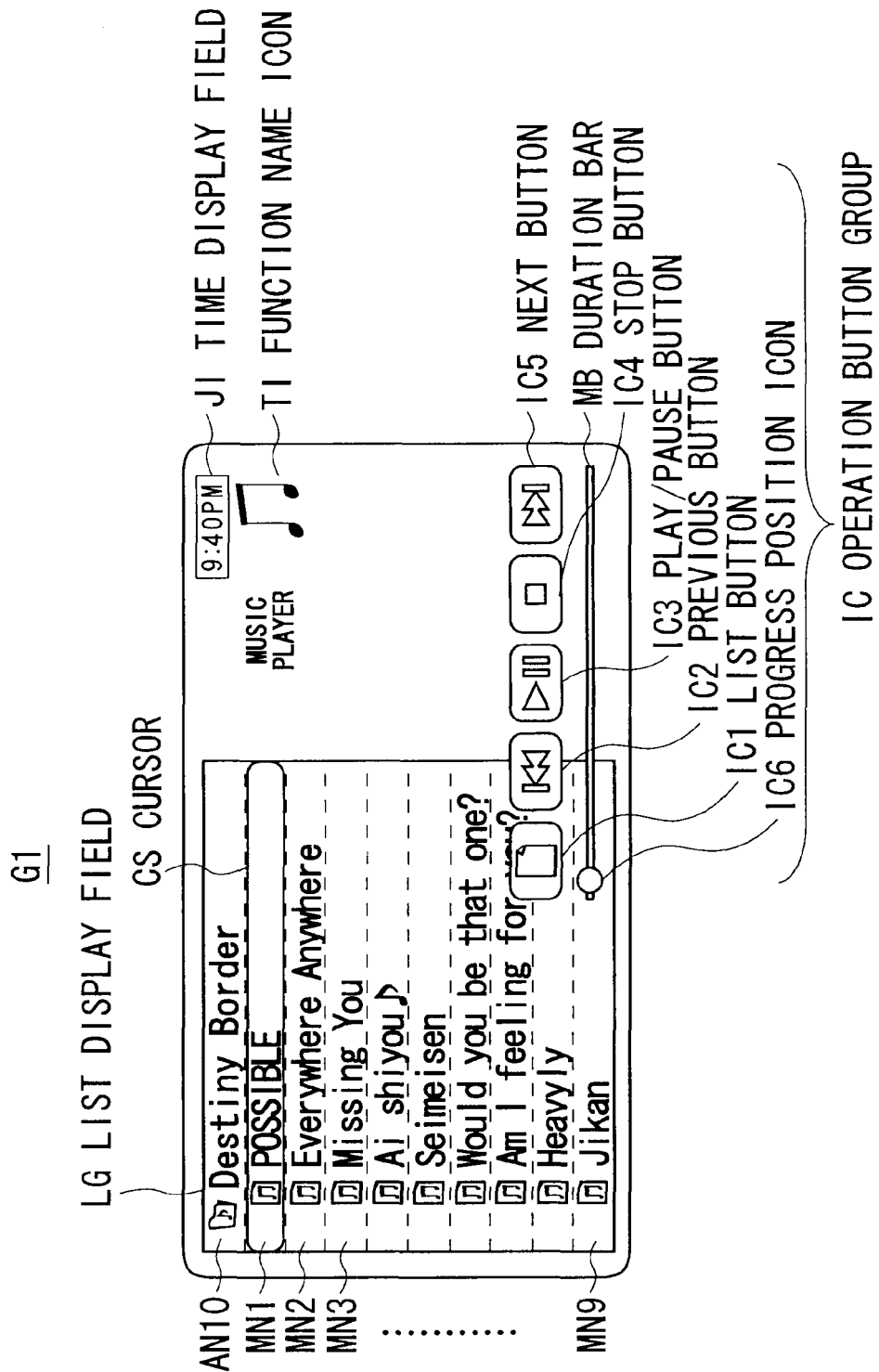
FIG. 17 is a schematic diagram showing the configuration (2) of the song select screen.

As shown in FIG. 17, suppose that the song select screen G1 is displayed on the LCD 9 of the monitor 3, with the cursor CS focused on the song item card MN1 which is displayed in the list display field LG of the song select screen G1. When the CPU 4 of the portable audio player 1 recognizes a user's touch operation on the play/pause button IC3, it proceeds to the following processing.

The CPU 4 of the portable audio player 1 reads a song file corresponding to the user-selected song item card MN1 from the memory 8. The CPU 4 of the portable audio player 1 then applies predetermined audio processing to the read song file, and outputs the resulting sound from an audio output unit (not shown).

Figure 18:
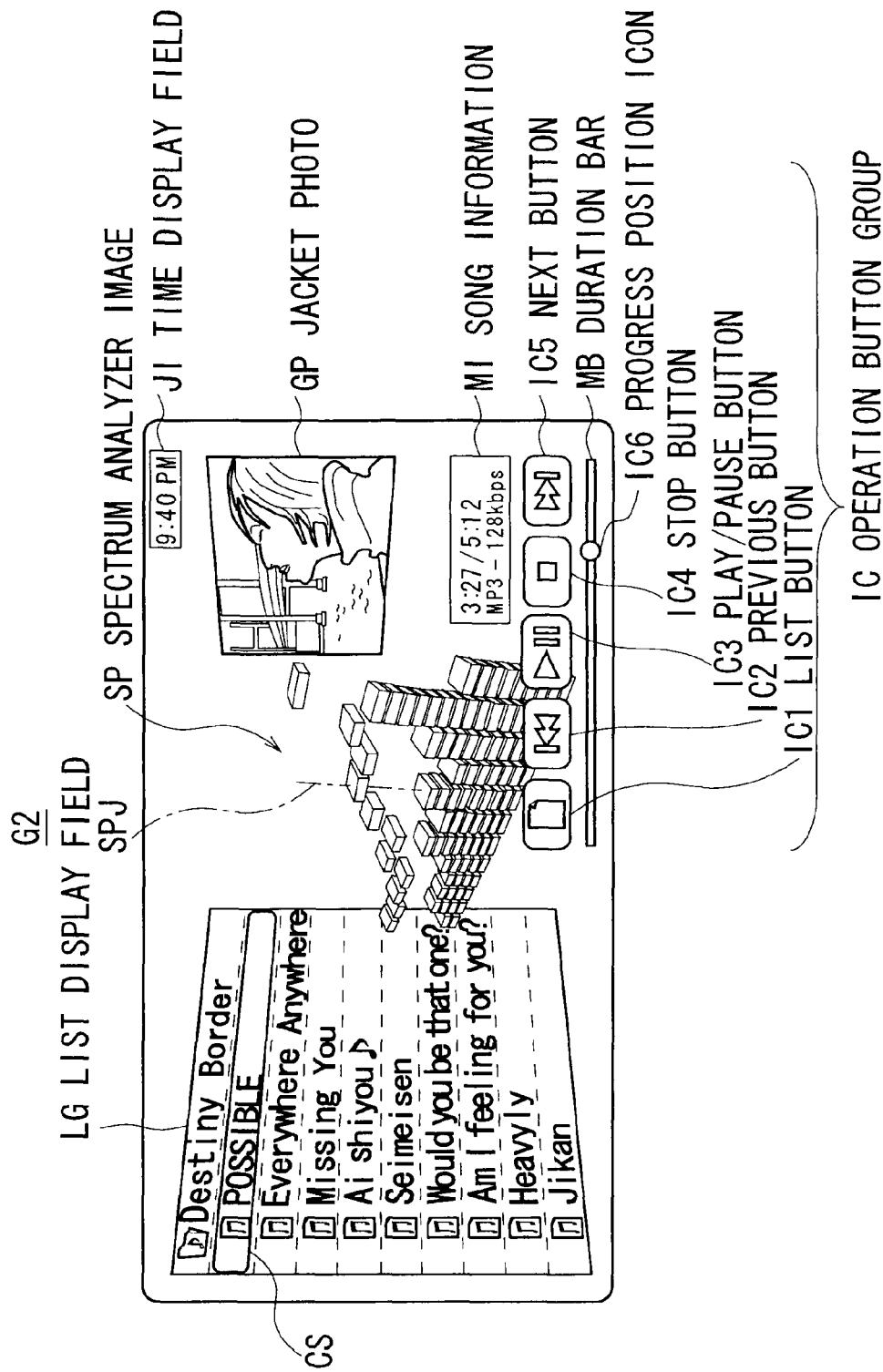
FIG. 18 is a schematic diagram showing the configuration of a song play screen.

While outputting the sound corresponding to the song item card MN1, the CPU 4 of the portable audio player 1 makes the GPU 7 draw a song play screen G2 and displays the song play screen G2 on the LCD 9 of the monitor 3 as shown in FIG. 18.

The song play screen G2 includes a three-dimensional spectrum analyzer image (hereinafter, referred to as spectrum analyzer image) SP, a jacket photo GP, and song information MI aside from the list display field LG, the time display field JI, and the operation button group IC.

Figure 19A:
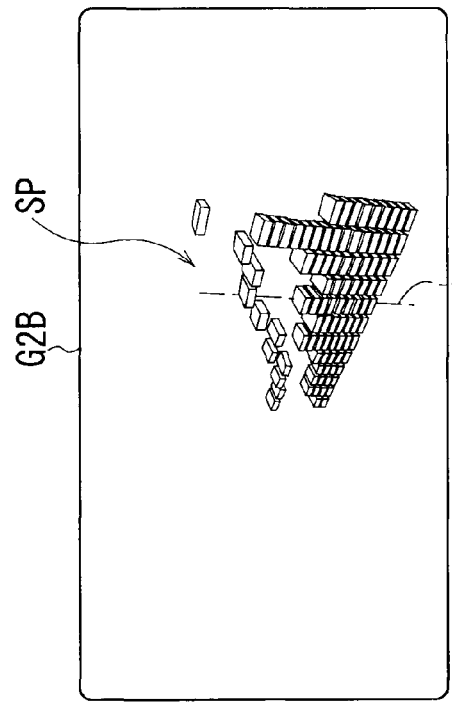
FIGS. 19A to 19D are schematic diagrams showing plane pictures of the song play screen.

Here, as shown in FIG. 19A, the CPU 4 of the portable audio player 1 makes the GPU 7 draw a button display picture G2A which includes the operation button group IC, the time display field JI, and the song information MI.

Incidentally, the CPU 4 of the portable audio player 1 reads song information data that accompanies the song file read from the memory 8, and generates the song information MI which consists of, e.g., song duration, compression format, and so on.

Figure 19B:
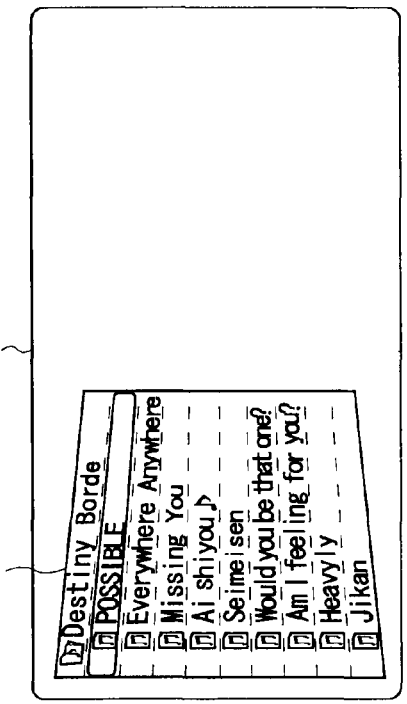

The CPU 4 of the portable audio player 1 applies frequency analysis processing and the like to the result of reproduction of the song file, piles up blocks according to the resulting output levels at respective predetermined frequencies, and makes the GPU 7 draw a spectrum analyzer picture G2B which includes the spectrum analyzer image SP rotating about a rotating axis SPJ as shown in FIG. 19B.

Figure 19C:
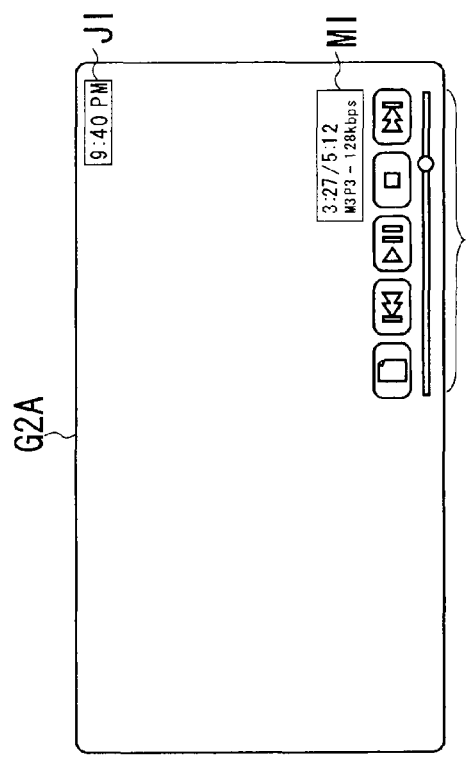

The CPU 4 of the portable audio player 1 also reads jacket photo data from the album folder corresponding to the album item card AN10, and makes the GPU 7 draw a jacket picture G2C which include the jacket photo GP corresponding to the jacket photo data as shown in FIG. 19C.

The CPU 4 of the portable audio player 1 also makes the GPU 7 draw a list display picture G2D in which the list display field LG is moved to rotate about the left end, with the right end to the far side, so that this list display field LG lies obliquely to the song play screen G2.

Figure 19D:
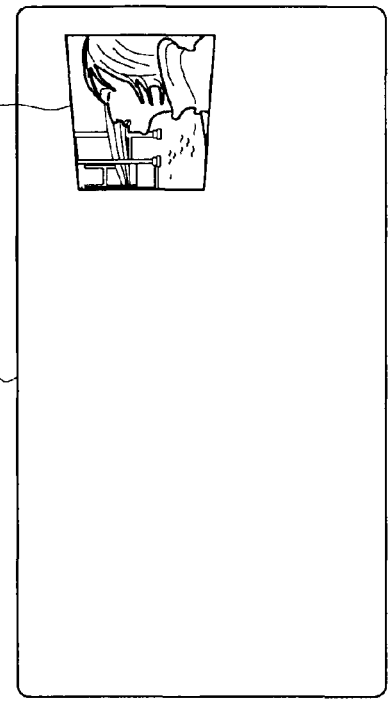
Figure 20:
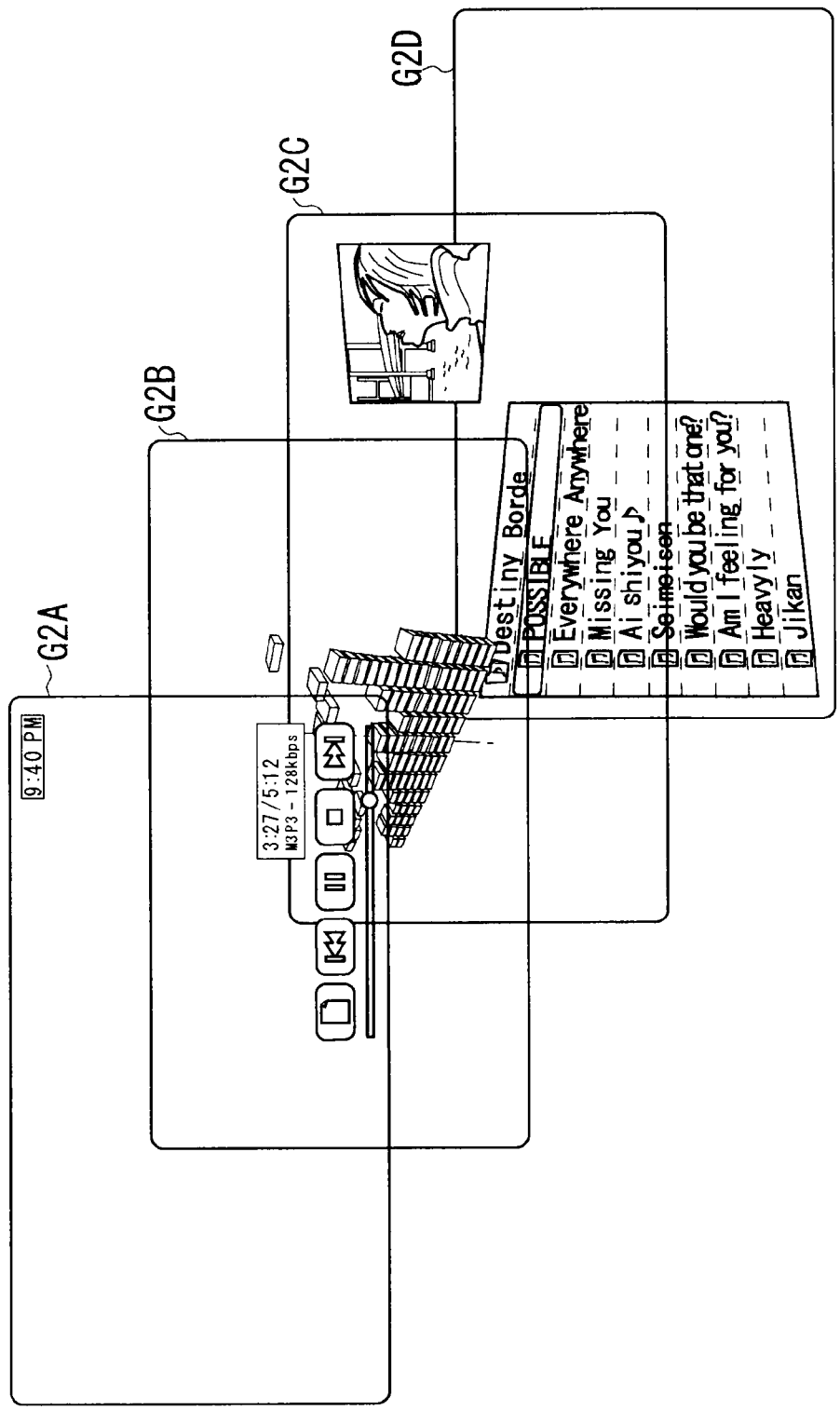
FIG. 20 is a schematic diagram showing the song select screen of four-layer structure.

As shown in FIG. 20, the song play screen G2 is formed by superimposing the button display picture G2A (FIG. 19A), the spectrum analyzer picture G2B (FIG. 19B), the jacket picture G2C (FIG. 19C), and the list display picture G2D (FIG. 19D) in top to bottom four layers. This makes it possible to provide a song play screen G2 such as shown in FIG. 18.

(4) Song Select and Play Processing

Figure 21:
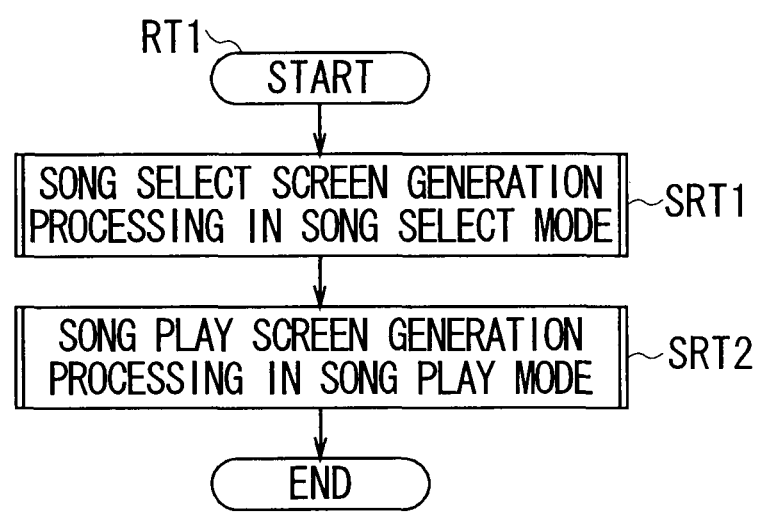
FIG. 21 is a flowchart for explaining the procedure of song select and play processing.

As shown in FIG. 21, the CPU 4 of the portable audio player 1 performs song select and play processing according to a song select and play program which is an application program. The CPU 4 enters routine RT1 from the start step and proceeds to the next subroutine SRT1.

Figure 22:
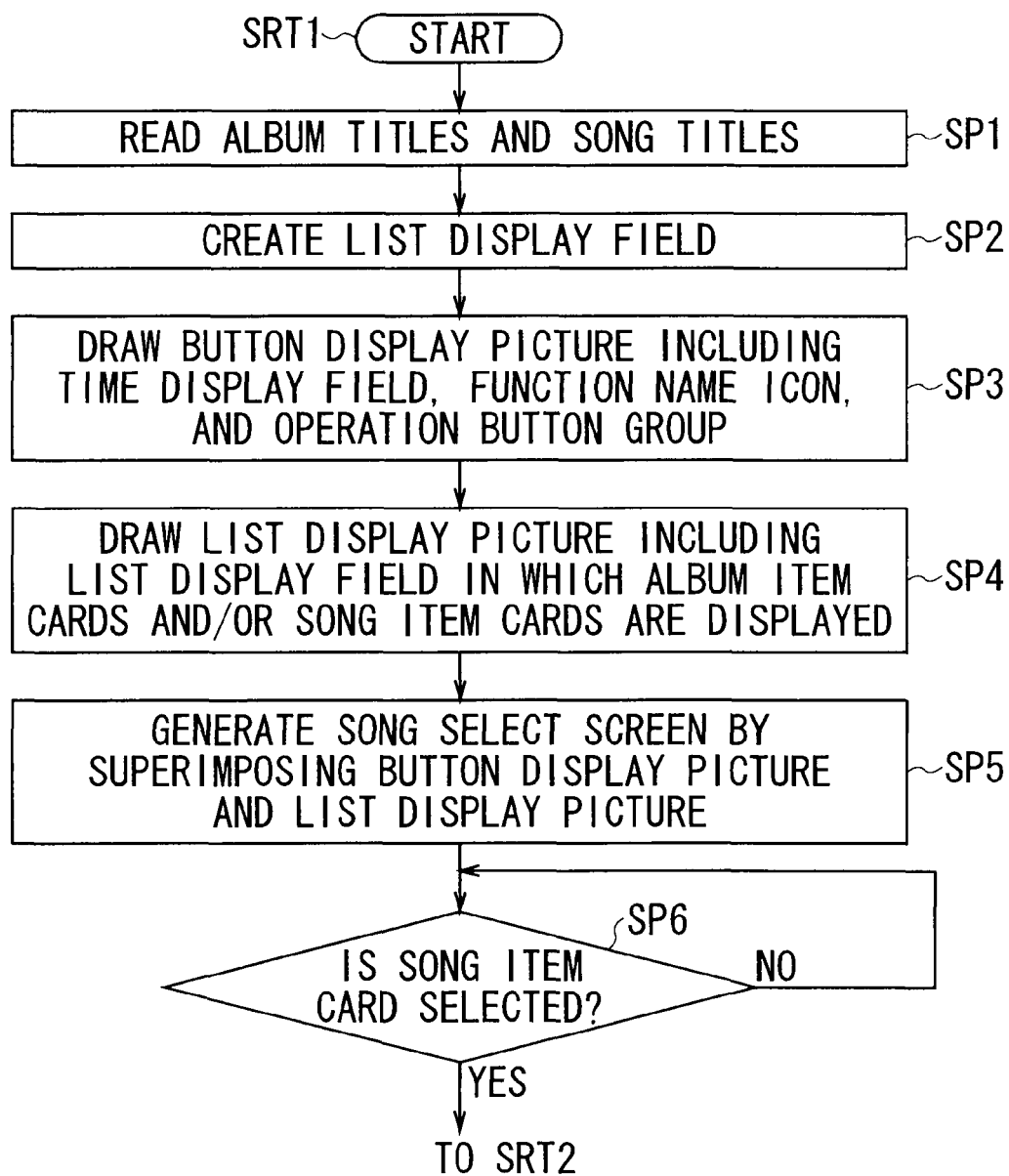
FIG. 22 is a flowchart for explaining the procedure of song select screen generation processing.

As shown in FIG. 22, the CPU 4 of the portable audio player 1 enters subroutine SRT1 from the start step and proceeds to the next step SP1. The CPU 4 reads album titles corresponding to a plurality of album folders and song titles corresponding to a plurality of song files stored in the memory 8, and then proceeds to the next step SP2.

At step SP2, the CPU 4 of the portable audio player 1 creates the list display field LG which displays a plurality of album item cards AN having a respective plurality of album titles, a plurality of song item cards MN having a respective plurality of song titles, etc. The CPU 4 then proceeds to the next step SP3.

At step SP3, the CPU 4 of the portable audio player 1 makes the GPU 7 draw the button display picture G1A which includes the time display field JI, the function name icon TI, and the operation button group IC, and then proceeds to the next step SP4.

At step SP4, the CPU 4 of the portable audio player 1 makes the GPU 7 draw the list display picture G1B which includes the list display field LG where a plurality of album item cards AN and song item cards MN are displayed, and then proceeds to the next step SP5.

At step SP5, the CPU 4 of the portable audio player 1 generates the song select screen G1 by superimposing the button display picture G1A drawn at step SP3 and the list display picture G1B drawn at step SP4 in top and bottom two layers, and then proceeds to the next step SP6.

At step SP6, the CPU 4 of the portable audio player 1 determines whether or not the list button IC1 is operated by touch, for example, with the cursor CS focused on the song item card MN1 displayed in the list display field LG. If the result is negative, the CPU 4 waits for a touch operation on the list button IC1.

On the other hand, if the result at step SP6 is positive, which indicates that the song item card MN1 is selected, the CPU 4 of the portable audio player 1 ends the song select screen generation processing and proceeds to the next subroutine SRT2.

Figure 23:
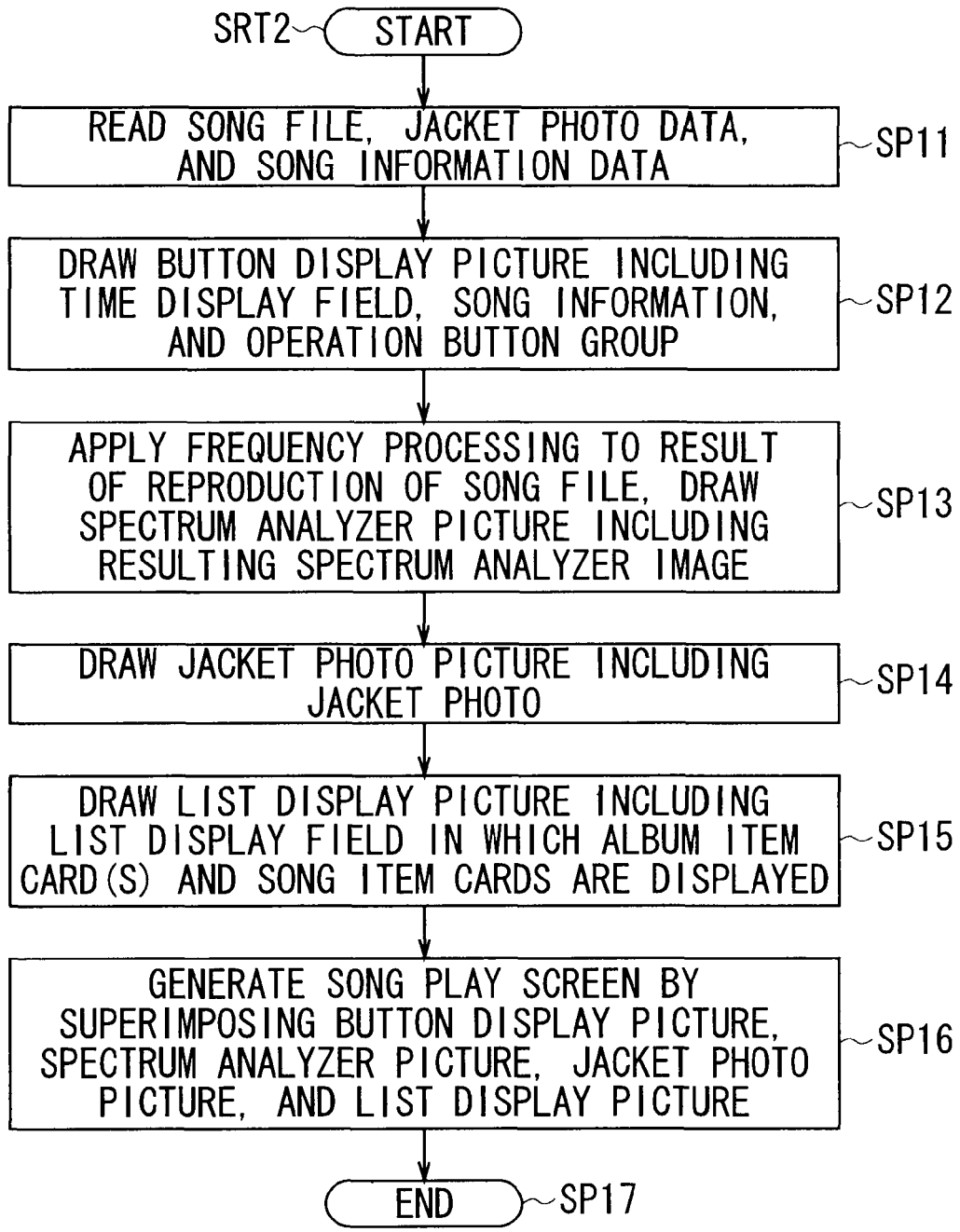
FIG. 23 is a flowchart for explaining the procedure of song play screen generation processing.

As shown in FIG. 23, the CPU 4 of the portable audio player 1 enters subroutine SRT2 from the start step and proceeds to the next step SP11. The CPU 4 reads from the memory 8 the song file, jacket photo data, and song information data corresponding to the song item card MN1 which is selected at step SP6 of subroutine SRT1, and then proceeds to the next step SP12.

At step SP12, the CPU 4 of the portable audio player 1 makes the GPU 7 draw the button display picture G2A which includes the time display field JI, the song information MI acquired from the song information data, and the operation button group IC, and then proceeds to the next step SP13.

At step SP13, the CPU 4 of the portable audio player 1 applies frequency analysis processing and the like to the result of reproduction of the song file, and makes the GPU 7 draw the spectrum analyzer picture G2B which includes the resulting spectrum analyzer image, and then proceeds to the next step SP14.

At step SP14, the CPU 4 of the portable audio player 1 makes the GPU 7 draw the jacket photo picture G2C which includes the jacket photo GP corresponding to the jacket photo data read from the memory 8, and then proceeds to the next step SP15.

At step SP15, the CPU 4 of the portable audio player 1 makes the GPU 7 draw the list display picture G2D which includes the list display field LG where a plurality of album item cards AN and song item cards MN are displayed, and then proceeds to the next step SP16.

At step SP16, the CPU 4 of the portable audio player 1 generates the song play screen G2 by superimposing the button display picture G2A drawn at step SP12, the spectrum analyzer picture G2B drawn at step SP13, the jacket photo picture G2C drawn at step SP14, and the list display picture G2D drawn at step SP15 in top to bottom four layers, and then proceeds to the next step SP17 to end the processing.

(4-1) Procedure of Song Item Card Expansion Processing

Figure 24:
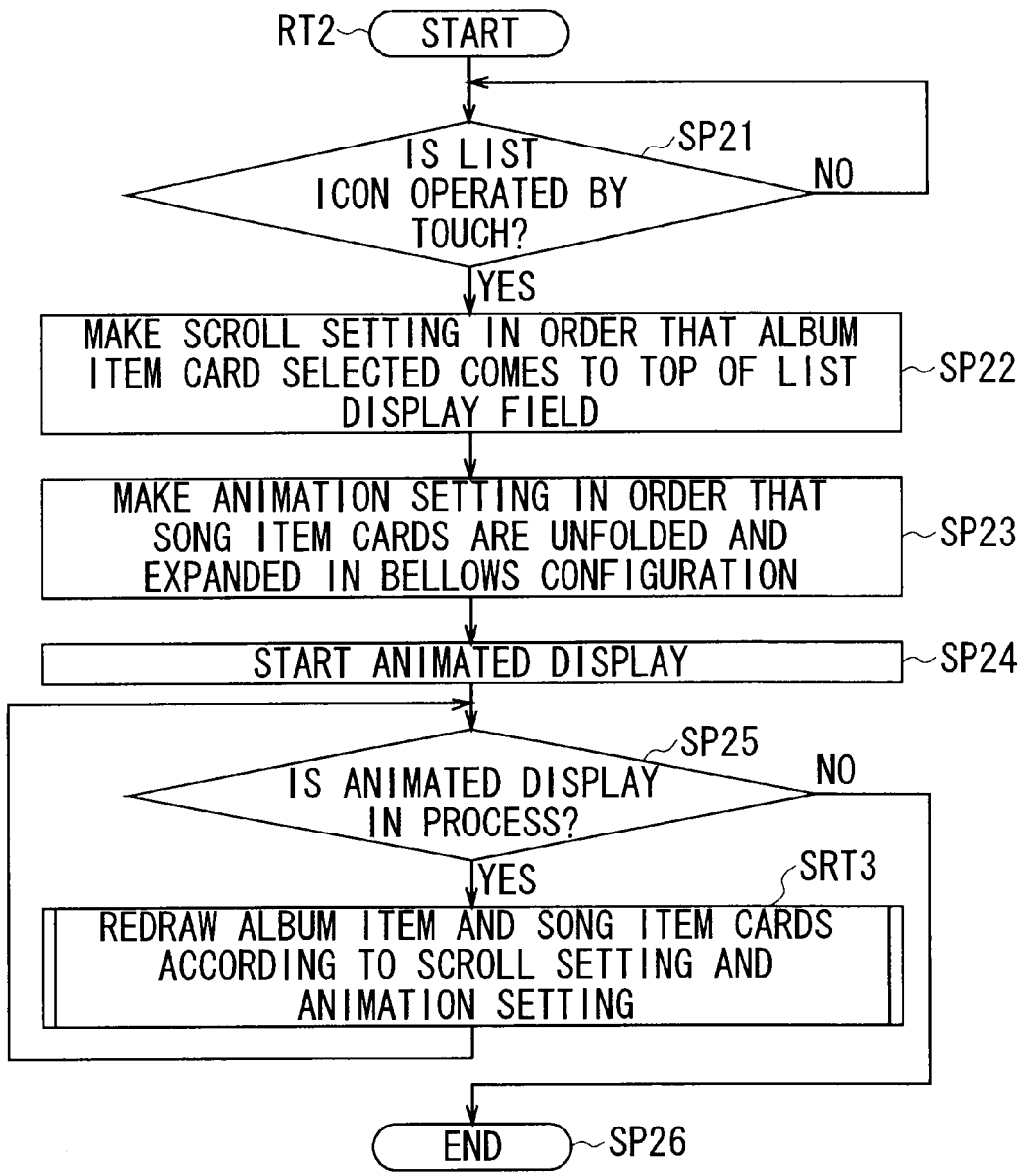
FIG. 24 is a flowchart for explaining the procedure of song item card expansion processing.

Next, referring to the flowchart of FIG. 24, description will be given of the procedure of song item card expansion processing for expanding a plurality of song item cards MN in a bellows configuration from the state where a plurality of album item cards AN alone are displayed in the list display field LG.

In fact, the CPU 4 of the portable audio player 1 enters routine RT2 from the start step and proceeds to the next step SP21. With the cursor CS focused on a user-desired album item card AN out of a plurality of album item cards AN displayed in the list display field LG, the CPU 4 determines whether or not the list button IC1 is operated by touch.

If the result at step SP21 is negative, which indicates that the list button IC1 is not yet to be operated by touch by the user, the CPU 4 of the portable audio player 1 waits for a touch operation on the list button IC1.

On the other hand, if the result at step SP21 is positive, which indicates that the list button IC1 is operated by touch by the user, the CPU 4 of the portable audio player 1 proceeds to the next step SP22.

At step SP22, the CPU 4 of the portable audio player 1 makes a scroll setting in order that the album item card AN selected by the user comes to the top of the list display field LG, and then proceeds to the next step SP23.

At step SP23, the CPU 4 of the portable audio player 1 makes an animation setting in order that all the song item cards MN associated with the user-selected album item card AN are expanded in a stereoscopic bellows configuration, and then proceeds to the next step SP24.

At step SP24, the CPU 4 of the portable audio player 1 starts an animated display of moving the user-selected album item card An to the top of the list display screen LG along the Y-axis (FIG. 9) and expanding all the song item cards MN in a bellows configuration according to the scroll setting made at step SP22 and the animation setting made at step SP23. The CPU 4 then proceeds to the next step SP25.

At step SP25, the CPU 4 of the portable audio player 1 determines whether or not the animated display started at step SP24 is still in process. If the result is positive, the CPU 4 proceeds to the next subroutine SRT3.

Figure 25:
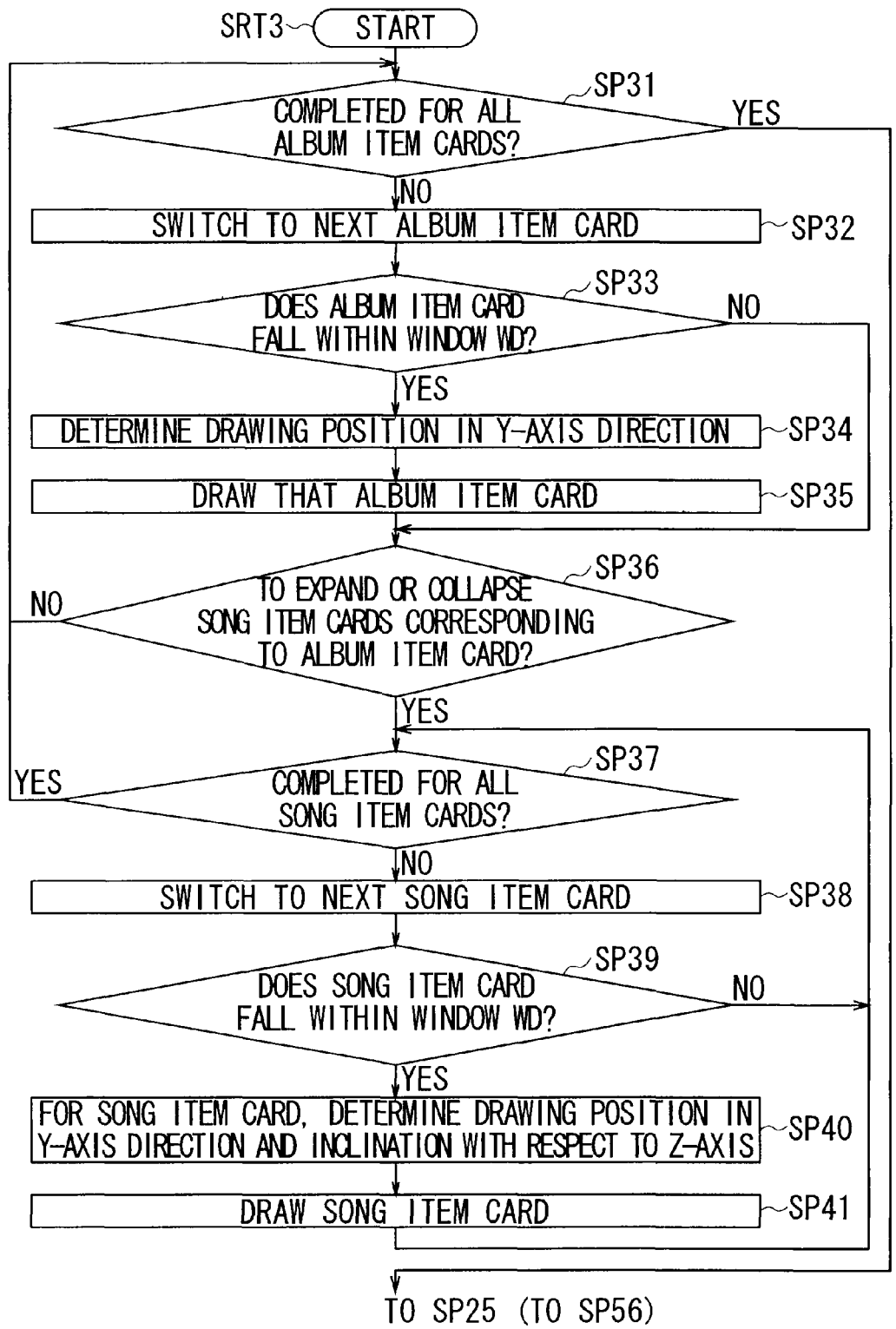
FIG. 25 is a flowchart for explaining the procedure of animation processing.

As shown in FIG. 25, the CPU 4 of the portable audio player 1 enters subroutine SRT3 from the start step and proceeds to the next step SP31. The CPU 4 initially determines whether or not checking of the animation processing has been completed for all the album item cards AN. If the result is negative, the CPU 4 proceeds to the next step SP32.

At step SP32, the CPU 4 of the portable audio player 1 switches to the next album item card AN because the checking of the animation processing has not yet been completed for all the album item cards AN. The CPU 4 then proceeds to the next step SP33.

At step SP33, the CPU 4 of the portable audio player 1 determines whether or not the album item card AN falls within the window WD. If the result is negative, which indicates that this album item card AN is not to be displayed in the list display field LG, then the CPU 4 proceeds to step SP36.

On the other hand, if the result at step SP33 is positive, which indicates that the album item card AN is to be displayed in the list display field LG, the CPU 4 of the portable audio player 1 proceeds to the next step SP34.

At step SP34, the CPU 4 of the portable audio player 1 determines the drawing position of the album item card AN in the Y-axis direction, and proceeds to the next step SP35.

At step SP35, the CPU 4 of the portable audio player 1 makes the GPU 7 draw the album item card AN in the drawing position determined at step SP34, and proceeds to the next step SP36.

At step SP36, the CPU 4 of the portable audio player 1 determines whether or not to expand or collapse all the song item cards MN corresponding to the album item card AN. If the result is negative, the CPU 4 returns to step SP31. If the result is positive, the CPU 4 proceeds to the next step SP37.

At step SP37, the CPU 4 of the portable audio player 1 determines whether or not the checking of the animation processing has been completed for all the song item cards MN. If the result is negative, the CPU 4 proceeds to the next step SP38.

At step SP38, the CPU 4 of the portable audio player 1 switches to the next song item card MN because the checking of the animation processing has not yet been completed for all the song item cards MN. The CPU 4 then proceeds to the next step SP39.

At step SP39, the CPU 4 of the portable audio player 1 determines whether or not the song item card MN falls within the window WD. If the result is negative, which indicates that this song item card MN is not to be displayed in the list display field LG, the CPU 4 returns to step SP37.

On the other hand, if the result at step SP39 is positive, the CPU 4 of the portable audio player 1 proceeds to the next step SP40.

At step SP40, the CPU 4 of the portable audio player 1 determines the drawing position of the song item card MN in the Y-axis direction and the inclination of this song item card MN with respect to the Z-axis, and proceeds to the next step SP41.

At step SP41, the CPU 4 of the portable audio player 1 makes the GPU 7 draw the song item card MN based on the drawing position and the inclination determined at step SP40, and returns to step SP37.

At step SP37, the CPU 4 of the portable audio player 1 determines again whether or not the checking of the animation processing has been completed for all the song item cards MN. If the result is positive, the CPU 4 returns to step SP31.

At step SP31, the CPU 4 of the portable audio player 1 determines again whether or not the checking of the animation processing has been completed for all the album item cards AN. If the result is positive, the CPU 4 ends the animation processing and returns to step SP25 (FIG. 24).

At step SP25, the CPU 4 of the portable audio player 1 repeats the processing of step SP25 and subroutine SRT3 until the animated display according to the scroll setting and animation setting is completed. When the animated display is completed to result in a negative determination, the CPU 4 proceeds to the next step SP26 to end the processing.

(4-2) Procedure of Song Item Card Collapsing Processing

Figure 26:
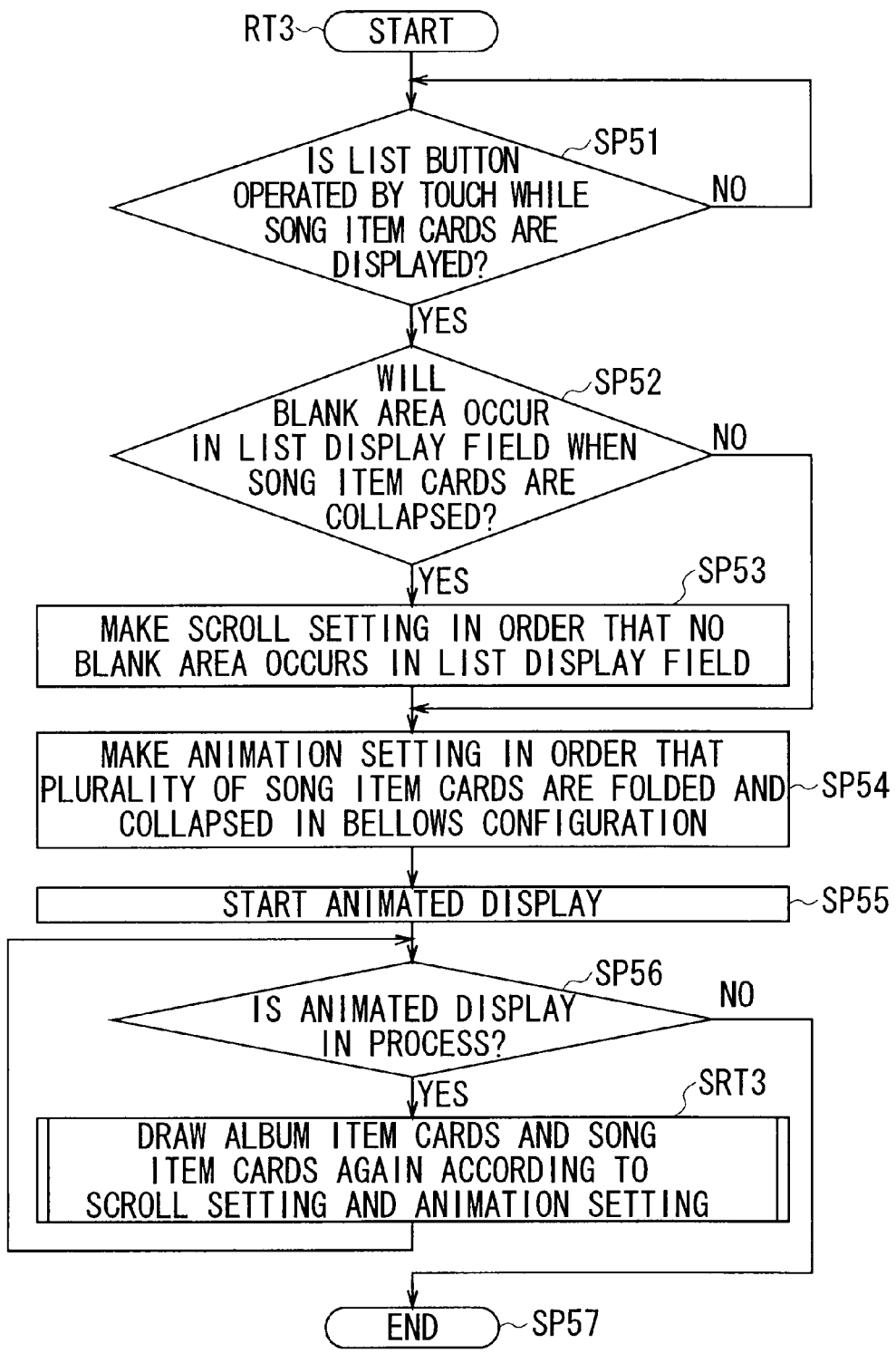
FIG. 26 is a flowchart for explaining the procedure of song item card collapsing processing.

Next, referring to the flowchart of FIG. 26, description will be given of the procedure of song item card collapsing processing for folding a plurality of song item cards MN in a bellows configuration from the state where the plurality of song item cards MN are displayed in the list display field LG, thereby collapsing the plurality of song item cards MN to display a plurality of album item cards AN alone in the list display field LG.

In fact, the CPU 4 of the portable audio player 1 enters routine RT3 from the start step and proceeds to the next step SP51. With a plurality of song item cards MN displayed in the list display field LG, the CPU 4 determines whether or not the list button IC1 is operated by touch.

If the result at step SP51 is negative, which indicates that the list button IC1 is not yet to be operated by touch by the user, the CPU 4 of the portable audio player 1 waits for a touch operation on the list button IC1.

On the other hand, if the result at step SP51 is positive, which indicates that the list button IC1 is operated by touch by the user, the CPU 4 of the portable audio player 1 proceeds to the next step SP52.

At step SP52, the CPU 4 of the portable audio player 1 determines whether or not a blank area occurs in the list display field LG when all the song item cards MN are collapsed. If the result is positive, the CPU 4 proceeds to the next step SP53. If the result is negative, the CPU 4 proceeds to step SP54.

At step SP53, the CPU 4 of the portable audio player 1 makes a scroll setting in order that the album item card AN at the bottom of the album list LG (FIG. 4) (in this case, the album item card AN20) comes to the bottom of the list display field LG. The CPU 4 then proceeds to the next step SP54.

At step SP54, the CPU 4 of the portable audio player 1 makes an animation setting in order to fold all the song item cards MN in a bellows configuration. The CPU 4 then proceeds to the next step SP55.

At step SP55, the CPU 4 of the portable audio player 1 starts an animated display of folding all the song item cards MN in a bellows configuration without producing a blank area in the list display field LG, according to the scroll setting made at step SP53 and the animation setting made at step SP54. The CPU 4 then proceeds to the next step SP56.

At step SP56, the CPU 4 of the portable audio player 1 determines whether or not the animated display started at step SP55 is still in process. If the result is positive, the CPU 4 proceeds to the foregoing subroutine SRT3.

In subroutine SRT3, the CPU 4 of the portable audio player 1 performs animation processing according to the procedure of animation processing, and returns to step SP56.

At step SP56, the CPU 4 of the portable audio player 1 repeats the processing of this step SP56 and subroutine SRT3 until the animated display according to the scroll setting and animation setting is completed. When the animated display is completed to result in a negative determination, the CPU 4 proceeds to the next step SP57 to end the processing.

(5) Operation and Effect

With the foregoing configuration, the CPU 4 of the portable audio player 1 reads all the folder names (album title) stored in the memory 8, and displays ten of album item cards AN having all the respective folder names in the list display field LG.

When a user-desired album item card AN is selected from among the plurality of album item cards AN displayed in the list display field LG, the CPU 4 of the portable audio player 1 displays a three-dimensional list display field LG such that a plurality of song item cards MN associated with the album item card AN are unfolded and expanded in a bellows configuration.

When a plurality of song item cards MN are displayed flatly in the list display field LG and the list button IC1 is operated by touch, the CPU 4 of the portable audio player 1 displays a three-dimensional list display field LG such that the plurality of song item cards MN are folded and collapsed in a bellows configuration.

Consequently, by unfolding and expanding a plurality of song item cards MN in a bellows configuration and by folding and collapsing the plurality of song item cards MN in a bellows configuration, the portable audio player 1 allows the user to intuitively recognize the process of transition between the state where a plurality of album item cards AN alone are displayed and the state where a plurality of song item cards MN are displayed.

By unfolding and expanding a plurality of song item cards MN in a bellows configuration and by folding and collapsing the plurality of song item cards MN in a bellows configuration, the portable audio player 1 can stereoscopically display the plurality of song item cards MN in the process of expanding and collapsing. This can increase the amount of information that can be displayed at a time.

The portable audio player 1 can also display a plurality of album item cards AN and a plurality of song item cards MN in the list display field LG at the same time, so that the user can visually observe both the plurality of album item cards AN and song item cards MN.

Since it can display a plurality of album item cards AN and a plurality of song item cards MN in the list display field LG at the same time, the portable audio player 1 can also make the user intuitively recognize the hierarchical relationship between an album item card AN of higher level and a plurality of song item cards MN of lower level.

Moreover, by unfolding and expanding a plurality of song item cards MN in a bellows configuration and by folding and collapsing the plurality of song item cards MN in a bellows configuration, the portable audio player 1 can display the list display field LG in a user-friendly and user-entertaining way.

The portable audio player 1 forms the song select screen G1 in two layers by superimposing the button display picture G1A and the list display picture G1B. When providing an animated display of expanding or collapsing a plurality of song item cards MN, the portable audio player 1 therefore need not modify the button display picture G1A which requires no particular motion. This can reduce the processing load on the CPU 4 and the GPU 7.

The portable audio player 1 forms the song play screen G2 in four layers by superimposing the button display picture G2A, the spectrum analyzer picture G2B, the jacket photo picture G2C, and the list display picture G2D. When providing an animated display of expanding or collapsing a plurality of song item cards MN, the portable audio player 1 therefore need not modify the button display picture G2A, the spectrum analyzer picture G2B, and the jacket photo picture G2C which require no particular motion. This can reduce the processing load on the CPU 4 and the GPU 7.

According to the foregoing configuration, the portable audio player 1 switches between the state where a plurality of album item cards AN are displayed and the state where a plurality of song item cards MN are displayed, by unfolding and expanding the plurality of song item cards MN in a bellows configuration or by folding and collapsing the plurality of song item cards MN in a bellows configuration. The portable audio player 1 thereby allows the user to intuitively recognize the hierarchical relationship between the higher and lower levels.

(6) Other Embodiments

The foregoing embodiment has dealt with the case where an album item card AN is selected by the user and all the song item cards MN corresponding to the album item card AN are fully expanded within a predetermined time. However, the present invention is not limited thereto. For example, when an album item card AN is selected by the user, all the song item cards MN may be displayed in the list display field LG as stopped in the process of bellows-like expansion.

In this case, the list display field LG can display a large number of song item cards MN in the bellows configuration for a long time, so that the user can visually observe the large number of song item cards MN for a long time.

The foregoing embodiment has also dealt with the case where the state that a plurality of album item cards AN alone are displayed and the state that a plurality of song item cards MN are displayed are switched by a touch operation on the list button IC1. However, the present invention is not limited thereto. The state where a plurality of album item cards AN alone are displayed and the state where a plurality of song item cards MN are displayed may be switched, for example, in response to a depressing operation on a not-shown ENTER button or the like.

The foregoing embodiment has also dealt with the case where a plurality of album item cards AN and song item cards MN to be displayed in the list display field LG are scrolled according to user's touch operations as if sweeping up/down. However, the present invention is not limited thereto. For example, a scroll bar may be displayed on the song select screen G1 and the cards may be scrolled according to user's touch operations on the scroll bar.

The foregoing embodiment has also dealt with the case where all the song item cards MN corresponding to a user-selected album item card AN are expanded in a bellows configuration. However, the present invention is not limited thereto. Not only the song item cards MN associated with a user-selected album item card AN but also all those associated with all the album item cards AN may be expanded in a bellows configuration.

In this case, the portable audio player 1 allows the user to visually observe a plurality of song item cards MN associated with user-unselected album item cards AN, as well as the plurality of song item cards MN associated with the user-selected album item card AN.

The foregoing embodiment has also dealt with the case where the hierarchical structure is constructed by storing a large number of song files into album folders. However, the present invention is not limited thereto. For example, a hierarchical structure may be constructed based on the pieces of song information data that accompany the respective large number of song files.

The foregoing embodiment has also dealt with the application to displaying song titles stored in album folders. However, the present invention is not limited thereto. For example, an embodiment of the present invention may be applied to the case of displaying a plurality of television programs that are associated with a plurality of genres in a television set. Another embodiment of the present invention may be applied to the case of displaying a plurality of points of interest (POIs) and the like that are associated with a plurality of classification genres in a vehicle navigation apparatus.

The foregoing embodiment had also dealt with the case where the CPU 4 of the portable audio player 1 performs the procedure of song select and play processing of the foregoing routine RT1, according to an application program that is previously stored in the ROM 5. However, the present invention is not limited thereto. The foregoing procedure of song select and play processing may be performed according to an application program that is installed from a recording medium, an application program that is downloaded over the Internet, or an application program that is installed by various other routes.

The foregoing embodiment had also dealt with the case where the CPU 4 of the portable audio player 1 performs the procedure of song item card expansion processing of the foregoing routine RT2 and the procedure of song item card collapsing processing of routine RT3 according to application programs that are previously stored in the ROM 5. However, the present invention is not limited thereto. The foregoing procedures of song item card expansion processing and song item card collapsing processing may be performed according to application programs that are installed from a recording medium, application programs that are downloaded over the Internet, or application programs that are installed by various other routes.

The foregoing embodiment has also dealt with the case where the portable audio player 1 as a list display apparatus according to an aspect of the present invention is composed of the CPU 4 and GPU 7 as a three-dimensional list generating unit, and the CPU 4 as a control unit. However, the present invention is not limited thereto. The list display apparatus may be composed of a three-dimensional list generation unit and control unit of various other configurations.

The list display apparatus according to an aspect of the present invention may be applied to various other implementations of electronic equipment, including a personal computer, a desktop audio apparatus, a portable navigation apparatus, and a game console.

It should be understood by those skilled in the art that various modifications, combinations, sub-combinations and alterations may occur depending on design requirements and other factors insofar as they are within the scope of the appended claims or the equivalents thereof.

What is claimed is:

1. A list display apparatus, comprising:
   circuitry configured to:
   generate a three-dimensional list picture, the three-dimensional list picture having a plurality of separate lower items, each associated with one of plural upper items and having respective predetermined lower item text in a hierarchical structure being unfolded and expanded in a mountain/valley-folded bellows configuration when shifting from an upper level to a lower level of the hierarchical structure such that each of the plurality of lower items is on a separate visually inclined portion of the mountain/valley-folded bellows configuration and the predetermined item text for each of the plurality of lower items is displayed on each respective separate visually inclined portion as inclined in a depth direction corresponding to a visual incline of the each respective separate visually inclined portion, or the plurality of lower items being folded and collapsed in the bellows configuration when shifting from the lower level to the upper level of the hierarchical structure, the circuitry generating the three-dimensional list picture by determining an inclination of one of the lower items with respect to a depth of the three-dimensional list picture upon a selection of an upper item in the upper level, wherein the plurality of lower items are displayed as being unfolded and expanded from a state of being invisible or folded and collapsed into a state of being invisible, while being attached to the upper item which is unaltered; and
   output the three-dimensional list picture to a predetermined display, thereby displaying the three-dimensional list picture as a hierarchical list on an angle in three dimensions once after an item of the three-dimensional list picture is selected for a playback, the three-dimensional list picture including at least a song title.

2. The list display apparatus according to claim 1, wherein, when the upper item is selected in the upper level, the circuitry controls unfolding and expanding the plurality of lower items associated with the upper item in the bellows configuration and moves the upper item to a top of the three-dimensional list picture.

3. The list display apparatus according to claim 2, wherein the circuitry controls displaying the plurality of lower items as stopped in the process of being expanded in the bellows configuration.

4. The list display apparatus according to claim 1, wherein, when folding and collapsing the plurality of lower items in the bellows configuration, the circuitry controls moving and displaying a plurality of upper items in the upper level to not produce a blank area in the three-dimensional list picture.

5. The list display apparatus according to claim 1, wherein, when the plurality of lower items are folded and collapsed in the bellows configuration, the upper item associated with the folded and collapsed lower items is moved downward on the display.

6. A list display method, comprising:
   generating, by a processor, a three-dimensional list, the three-dimensional list picture having a plurality of separate lower items, each associated with one of plural upper items and having respective predetermined lower item text in a hierarchical structure being unfolded and expanded in a mountain/valley-folded bellows configuration when shifting from an upper level to a lower level of the hierarchical structure such that each of the plurality of lower items is on a separate visually inclined portion of the mountain/valley-folded bellows configuration and the predetermined item text for each of the plurality of lower items is displayed on each respective separate visually inclined portion as inclined in a depth direction corresponding to a visual incline of the each respective separate visually inclined portion, or the plurality of lower items being folded and collapsed in the bellows configuration when shifting from the lower level to the upper level of the hierarchical structure, the processor generating the three-dimensional list picture by determining an inclination of one of the lower items with respect to a depth of the three-dimensional list picture upon a selection of an upper item in the upper level, wherein the plurality of lower items are displayed as being unfolded and expanded from a state of being invisible or folded and collapsed into a state of being invisible, while being attached to the upper item which is unaltered; and output the three-dimensional list picture to a predetermined display, thereby displaying the three-dimensional list picture as a hierarchical list on an angle in three dimensions once after an item of the three-dimensional list picture is selected for a playback, the three-dimensional list picture including at least a song title.

7. The list display method according to claim 6, wherein when the upper item is selected in the upper level, the plurality of lower items associated with the upper item are unfolded and expanded in the bellows configuration, and the upper item is moved to a top of the three-dimensional list picture.

8. The list display method according to claim 7, wherein the processor controls displaying the plurality of lower items as stopped in the process of being expanded in the bellows configuration.

9. The list display method according to claim 6, wherein when the plurality of lower items are folded and collapsed in the bellows configuration, a plurality of upper items in the upper level are moved and displayed to not produce a blank area in the three-dimensional list picture.

10. The list display method according to claim 6, wherein, when the plurality of lower items are folded and collapsed in the bellows configuration, the upper item associated with the folded and collapsed lower items is moved downward on the display.

11. A list display apparatus, comprising:
circuitry configured to:
generate a three-dimensional list picture, the three-dimensional list picture having a plurality of separate lower items, each associated with one of plural upper items and having respective predetermined lower item text in a hierarchical structure being animatedly unfolded and expanded in a mountain/valley-folded bellows configuration when shifting from an upper level to a lower level of the hierarchical structure such that each of the plurality of lower items is on a separate visually inclined portion of the mountain/valley-folded bellows configuration and the predetermined item text for each of the plurality of lower items is displayed on each respective separate visually inclined portion as inclined in a depth direction corresponding to a visual incline of the each respective separate visually inclined portion, or the plurality of lower items being animatedly folded and collapsed in the bellows configuration when shifting from the lower level to the upper level of the hierarchical structure, wherein the mountain/valley-folded bellows configuration comprises pairs of items in a same level of the hierarchical structure that share a valley-side borderline and a mountain-side borderline when not completely expanded or collapsed, the valley-side borderline having a greater depth in the list picture than the mountain-side borderline, wherein the plurality of lower items are displayed as being unfolded and expanded from a state of being invisible or folded and collapsed into a state of being invisible, while being attached to the upper item which is unaltered; and output the three-dimensional list to a predetermined display, thereby displaying the three-dimensional list picture as a hierarchical list on an angle in three dimensions once after an item of the three-dimensional list picture is selected for a playback, the three-dimensional list picture including at least a song title.

12. The list display apparatus according to claim 11, wherein, when the upper item is selected in the upper level, the circuitry controls unfolding and expanding the plurality of lower items associated with the upper item in the bellows configuration and moves the upper item to a top of the three-dimensional list picture.

13. The list display apparatus according to claim 12, wherein the circuitry controls displaying the plurality of lower items as stopped in the process of being expanded in the bellows configuration.

14. The list display apparatus according to claim 11, wherein, when folding and collapsing the plurality of lower items in the bellows configuration, the circuitry controls moving and displaying a plurality of upper items in the upper level to not produce a blank area in the three-dimensional list picture.

15. The list display apparatus according to claim 11, wherein, when the plurality of lower items are folded and collapsed in the bellows configuration, the upper item associated with the folded and collapsed lower items is moved downward on the display.

16. A list display method, comprising:
generating, by a processor, a three-dimensional list picture, the three-dimensional list picture having a plurality of separate lower items, each associated with one of plural upper items, and having respective predetermined lower item text in a hierarchical structure being animatedly unfolded and expanded in a mountain/valley-folded bellows configuration when shifting from an upper level to a lower level of the hierarchical structure such that each of the plurality of lower items is on a separate visually inclined portion of the mountain/valley-folded bellows configuration and the predetermined item text for each of the plurality of lower items is displayed on each respective separate visually inclined portion as inclined in a depth direction corresponding to a visual incline of the each respective separate visually inclined portion, or the plurality of lower items being animatedly folded and collapsed in the bellows configuration when shifting from the lower level to the upper level of the hierarchical structure, wherein the mountain/valley-folded bellows configuration comprises pairs of items in a same level of the hierarchical structure that share a valley-side borderline and a mountain-side borderline when not completely expanded or collapsed, the valley-side borderline having a greater depth in the list picture than the mountain-side borderline, wherein the plurality of lower items are displayed as being unfolded and expanded from a state of being invisible or folded and collapsed into a state of being invisible, while being attached to the upper item which is unaltered; and output the three-dimensional list picture to a predetermined display, thereby displaying the three-dimensional list picture as a hierarchical list on an angle in three dimensions once after an item of the three-dimensional list picture is selected for a playback, the three-dimensional list picture including at least a song title.

17. The list display method according to claim 16, wherein, when the plurality of lower items are folded and collapsed in the bellows configuration, the upper item associated with the folded and collapsed lower items is moved downward on the display.

18. A non-transitory computer-readable storage medium encoded with computer executable instructions, wherein the instructions, when executed by a processing unit, cause the processing unit to perform a method comprising:

generating a three-dimensional list picture having a plurality of separate lower items, each associated with one of plural upper items and having respective predetermined lower item text in a lower level of a hierarchical structure, the hierarchical structure having an upper item in the upper level, the plurality of lower items being unfolded and expanded in a mountain/valley-folded bellows configuration when shifting from the upper level to the lower level such that each of the plurality of lower items is on a separate visually inclined portion of the mountain/valley-folded bellows configuration and the predetermined item text for each of the plurality of lower items is displayed on each respective separate visually inclined portion as inclined in a depth direction corresponding to a visual incline of the each respective separate visually inclined portion, or the plurality of lower items being folded and collapsed in the bellows configuration when shifting from the lower level to the upper level, the generating including determining an inclination of one of the lower items with respect to a depth of the three-dimensional list picture upon a selection of the upper item, wherein the plurality of lower items are displayed as being unfolded and expanded from a state of being invisible or folded and collapsed into a state of being invisible, while being attached to the upper item which is unaltered; and outputting the three-dimensional list picture to a display, thereby displaying the three-dimensional list picture as a hierarchical list on an angle in three dimensions once after an item of the three-dimensional list picture is selected for a playback, the three-dimensional list picture including at least a song title.

19. The computer-readable storage medium according to claim 18, wherein, when the plurality of lower items are folded and collapsed in the bellows configuration, the upper item associated with the folded and collapsed lower items is moved downward on the display.

* * * * *